(12) United States Patent
Huang et al.

(10) Patent No.: US 12,704,718 B2
(45) Date of Patent: Aug. 11, 2026

(54) HEAD-WORN WEARABLE DEVICE PROVIDING INDICATIONS OF RECEIVED AND MONITORED SENSOR DATA, AND METHODS AND SYSTEMS OF USE THEREOF

(71) Applicant: Meta Platforms Technologies, LLC, Menlo Park, CA (US)

(72) Inventors: Willy Huang, San Francisco, CA (US); Benjamin Neal Bethurum, Shoreline, WA (US); David Sven Woodland, Issaquah, WA (US); Hind Hobeika, San Francisco, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/311,197

(22) Filed: May 2, 2023

(65) Prior Publication Data

US 2023/0368478 A1 Nov. 16, 2023

Related U.S. Application Data

(60) Provisional application No. 63/341,390, filed on May 12, 2022.

(51) Int. Cl.
*G02B 27/01* (2006.01)
*G06F 3/01* (2006.01)
(Continued)

(52) U.S. Cl.
CPC ............ *G02B 27/017* (2013.01); *G06F 3/011* (2013.01); *G06F 3/015* (2013.01); *G06F 3/017* (2013.01); *G06F 3/167* (2013.01); *G06T 19/006* (2013.01)

(58) Field of Classification Search
None
See application file for complete search history.

(56) References Cited

U.S. PATENT DOCUMENTS 5,689,669 A 11/1997 Lynch et al.
5,813,990 A 9/1998 Ryll
(Continued)

FOREIGN PATENT DOCUMENTS

CA 2275784 A1 12/1999
CA 2275784 C 10/2000
(Continued)

OTHER PUBLICATIONS

International Search Report and Written Opinion for International Application No. PCT/US2023/021916, mailed Aug. 9, 2023, 12 pages.

(Continued)

*Primary Examiner* — Jwalant Amin
(74) *Attorney, Agent, or Firm* — Morgan, Lewis & Bockius LLP

(57) ABSTRACT

Methods and systems of coordinating display of biometric data at a head-worn wearable device based on sensor data from a wrist-wearable device are disclosed. A method includes receiving an indication that a user of a head-worn wearable device is performing a physical activity. The head-worn wearable device includes a light-emitting diode visible to the user while wearing the head-worn wearable device and is in communication with a wrist-wearable device worn by the user. The wrist-wearable device is configured to sense biometric data for the user during the physical activity. The method includes, after receiving the indication and while the user is performing the activity, in accordance with a determination that the biometric data satisfies a physiological-based threshold indicating that information about the biometric data would assist the user in (Continued)

performing the physical activity, causing the head-worn wearable device to present, via the light-emitting diode, the information about the biometric data.

22 Claims, 17 Drawing Sheets

(51) Int. Cl.
*G06F 3/16* (2006.01)
*G06T 19/00* (2011.01)

(56) References Cited

U.S. PATENT DOCUMENTS 6,002,853 A 12/1999 De Hond
6,243,091 B1 6/2001 Berstis
6,271,843 B1 8/2001 Lection et al.
6,285,757 B1 9/2001 Carroll et al.
6,362,817 B1 3/2002 Powers et al.
6,414,679 B1 7/2002 Miodonski et al.
6,570,563 B1 5/2003 Honda
6,573,903 B2 6/2003 Gantt
6,590,593 B1 7/2003 Robertson et al.
6,621,508 B1 9/2003 Shiraishi et al.
6,690,393 B2 2/2004 Heron et al.
6,763,226 B1 7/2004 McZeal, Jr.
6,961,055 B2 11/2005 Doak et al.
7,376,238 B1 5/2008 Rivas et al.
7,382,288 B1 6/2008 Wilson et al.
7,414,629 B2 8/2008 Santodomingo et al.
7,467,356 B2 12/2008 Gettman et al.
7,653,877 B2 1/2010 Matsuda
7,746,343 B1 6/2010 Charaniya et al.
8,316,104 B2 11/2012 Galvez et al.
8,604,923 B1 12/2013 Rivas Alvarez
9,024,842 B1 5/2015 Prada et al.
9,274,507 B2 3/2016 Kim et al.
9,432,839 B2 8/2016 Stanley-Marbell et al.
9,442,523 B2 9/2016 Lee et al.
9,628,708 B2 4/2017 Cucci et al.
9,674,694 B2 6/2017 Subbaramoo et al.
9,743,045 B2 8/2017 Lin et al.
9,952,433 B2 4/2018 Um et al.
11,023,036 B1 6/2021 Atlas et al.
11,062,572 B1* 7/2021 Zhang .................... G08B 21/18
11,200,869 B1 12/2021 Post et al.
11,340,460 B2 5/2022 Muldoon et al.
11,567,329 B2 1/2023 Muldoon et al.
12,299,252 B2 5/2025 Morrison et al.
2001/0018667 A1 8/2001 Kim
2002/0021622 A1 2/2002 Baroche
2002/0095463 A1 7/2002 Matsuda
2003/0027514 A1* 2/2003 Bastian ................. B08B 15/023 454/56
2005/0093719 A1 5/2005 Okamoto et al.
2005/0128212 A1 6/2005 Edecker et al.
2006/0226991 A1 10/2006 Rivas
2008/0169998 A1 7/2008 Jacobsen et al.
2008/0235570 A1 9/2008 Sawada et al.
2013/0127980 A1 5/2013 Haddick et al.
2013/0342637 A1 12/2013 Felkai et al.
2014/0055352 A1 2/2014 Davis et al.
2014/0278229 A1* 9/2014 Hong .................... H04W 4/027 702/160
2015/0111558 A1 4/2015 Yang
2015/0215351 A1 7/2015 Barzuza et al.
2015/0258431 A1 9/2015 Stafford et al.
2015/0258432 A1 9/2015 Stafford et al.
2015/0281569 A1 10/2015 Mizuno et al.
2015/0309316 A1 10/2015 Osterhout et al.
2015/0355677 A1 12/2015 Breedvelt-Schouten et al.
2016/0054791 A1 2/2016 Mullins et al.
2016/0223578 A1 8/2016 Klosinski, Jr. et al.
2017/0046503 A1* 2/2017 Cho ....................... G16H 40/63
2017/0064071 A1 3/2017 Won et al.
2017/0237986 A1 8/2017 Choi et al.
2017/0365097 A1 12/2017 Lim et al.
2018/0088687 A1 3/2018 Hanover
2018/0217681 A1 8/2018 Hiroi
2018/0234622 A1 8/2018 Bostick et al.
2018/0246348 A1 8/2018 Shiratori
2018/0324562 A1 11/2018 Park et al.
2019/0009168 A1* 1/2019 Aman ................. A63F 3/00643
2019/0065026 A1 2/2019 Kiemele et al.
2019/0146219 A1 5/2019 Rodriguez, II
2019/0149937 A1 5/2019 Norris et al.
2019/0286224 A1 9/2019 De Nardi et al.
2020/0004313 A1 1/2020 Kelley et al.
2021/0011556 A1 1/2021 Atlas et al.
2021/0089117 A1 3/2021 Bodolec et al.
2021/0154530 A1 5/2021 Carpenter et al.
2021/0224522 A1 7/2021 Park
2021/0255461 A1 8/2021 Watanabe et al.
2021/0256175 A1 8/2021 Bailey et al.
2021/0356743 A1 11/2021 Muldoon et al.
2021/0365113 A1* 11/2021 Chalmers ............. G02B 27/017
2022/0067965 A1 3/2022 Woods et al.
2023/0280591 A1 9/2023 Shin et al.
2023/0297447 A1 9/2023 Takamizawa et al.
2023/0329636 A1* 10/2023 Ramp .................... G16H 40/63
2024/0211090 A1 6/2024 Dasher et al.
2025/0138627 A1 5/2025 Akiyama et al.
2025/0370548 A1 12/2025 Whitmire et al.

FOREIGN PATENT DOCUMENTS

CN 101345962 A 1/2009
CN 104834106 A 8/2015
CN 207802071 U 8/2018
CN 108881778 A 11/2018
CN 210427993 U 4/2020
CN 215603765 U * 1/2022
EP 2863276 A2 4/2015
EP 3089658 A1 11/2016
FR 2979517 A3 3/2013
GB 2419058 A 4/2006
KR 20080029394 A 4/2008
WO 0055978 A1 9/2000

OTHER PUBLICATIONS

Notice of Allowance mailed Feb. 12, 2025 for U.S. Appl. No. 18/330,310, filed Jun. 6, 2023, 3 pages.

Notice of Allowance mailed Jan. 17, 2025 for U.S. Appl. No. 18/330,310, filed Jun. 6, 2023, 6 pages.

International Preliminary Report on Patentability for International Application No. PCT/US2023/021916, mailed Nov. 21, 2024, 9 pages.

Non-Final Office Action mailed Jul. 18, 2024 for U.S. Appl. No. 18/330,310, filed Jun. 6, 2023, 18 pages.

Notice of Allowance mailed Nov. 8, 2024 for U.S. Appl. No. 18/330,310, filed Jun. 6, 2023, 5 pages.

Final Office Action mailed Jan. 7, 2026 for U.S. Appl. No. 18/330,288, filed Jun. 6, 2023, 12 pages.

Non-Final Office Action mailed Dec. 31, 2025 for U.S. Appl. No. 19/190,531, filed Apr. 25, 2025, 23 pages.

Office Action mailed Feb. 27, 2026 for Indian Application No. 202317055519, filed Aug. 18, 2023, 8 pages.

Burns G., "iPhone Users are Getting this Temperature Warning," SlashGear, Jun. 25, 2018, Retrieved on [Feb. 18, 2021], 11 pages, Retrieved from the Internet: URL: https://www.slashgear.com/iphone-users-are-getting-this-temperature-warning-25535440/.

European Search Report for European Patent Application No. 24172578.7, dated Jun. 19, 2024, 8 pages.

International Preliminary Report on Patentability for International Application No. PCT/US2022/025290, mailed Nov. 2, 2023, 14 pages.

International Search Report and Written Opinion for International Application No. PCT/US2022/025290, mailed Sep. 8, 2022, 18 pages.

(56) References Cited

OTHER PUBLICATIONS

Invitation to Pay Additional Fees for International Application No. PCT/US2022/025290 mailed Jul. 18, 2022, 14 pages.
IPhonetrics, "Apple Watch Temperature Warning Screen," TILs, Sep. 28, 2015, Retrieved on [Feb. 18, 2021], 10 pages, Retrieved from the Internet: URL: https://www.iphonetricks.org/apple-watch-temperature-warning-screen/.
Machine Translation of FR2979517A3, Mar. 1, 2013, 21 pages.
Non-Final Office Action mailed Jul. 1, 2022 for U.S. Appl. No. 17/721,322, filed Apr. 14, 2022, 13 pages.
Non-Final Office Action mailed Jun. 10, 2022 for U.S. Appl. No. 17/721,304, filed Apr. 14, 2022, 10 pages.
Non-Final Office Action mailed Mar. 13, 2024 for U.S. Appl. No. 18/184,614, filed Mar. 15, 2023, 13 pages.
Non-Final Office Action mailed Jun. 20, 2022 for U.S. Appl. No. 17/721,327, filed Apr. 14, 2022, 13 pages.
Non-Final Office Action mailed Jul. 25, 2025 for U.S. Appl. No. 18/330,288, filed Jun. 6, 2023, 14 pages.
Notice of Allowance mailed Sep. 6, 2024 for U.S. Appl. No. 18/184,614, filed Mar. 15, 2023, 8 pages.
Notice of Allowance mailed Feb. 8, 2023 for U.S. Appl. No. 17/721,304, filed Apr. 14, 2022,11 pages.
Notice of Allowance mailed Dec. 9, 2022 for U.S. Appl. No. 17/721,327, filed Apr. 14, 2022, 8 pages.
Notice of Allowance mailed Dec. 16, 2022 for U.S. Appl. No. 17/721,322, filed Apr. 14, 2022, 12 pages.
Notice of Allowance mailed Sep. 18, 2024 for U.S. Appl. No. 18/184,614, filed Mar. 15, 2023, 4 pages.
Notice of Allowance mailed Nov. 2, 2022 for U.S. Appl. No. 17/721,322, filed Apr. 14, 2022, 11 pages.
Notice of Allowance mailed Aug. 24, 2022 for U.S. Appl. No. 17/721,327, filed Apr. 14, 2022, 9 pages.
Notice of Allowance mailed Aug. 25, 2022 for U.S. Appl. No. 17/721,304, filed Apr. 14, 2022, 8 pages.
Notice of Allowance mailed Mar. 27, 2023 for U.S. Appl. No. 17/721,327, filed Apr. 14, 2022, 8 pages.
Office Action mailed Jun. 2, 2025 for European Patent Application No. 24172578.7, filed on Apr. 19, 2022, 5 pages.
Office Action mailed May 30, 2025 for European Patent Application No. 22726555.0, filed on Apr. 19, 2022, 6 pages.
Restriction Requirement mailed Apr. 28, 2025 for U.S. Appl. No. 18/330,288, filed Jun. 6, 2023, 6 pages.

* cited by examiner

HEAD-WORN WEARABLE DEVICE PROVIDING INDICATIONS OF RECEIVED AND MONITORED SENSOR DATA, AND METHODS AND SYSTEMS OF USE THEREOF

CROSS-REFERENCE TO RELATED APPLICATIONS

This application claims priority to U.S. Prov. App. No. 63/341,390, filed on May 12, 2022, and entitled "Head-Worn Wearable Device Providing Indications of Received and Monitored Sensor Data, and Methods and Systems of Use Thereof," which is incorporated herein by reference.

TECHNICAL FIELD

This application relates generally to communicating information to a user via a head-worn wearable device, more particularly, to coordinating the display of sensor data to a user at a head-worn wearable device based on sensor data from a wrist-wearable device.

BACKGROUND

Users performing physical activities conventionally carry a number of electronic devices to assist them in performing a physical activity. For example, users can carry fitness trackers, smartphones, or other devices that include biometric sensors that track a user's performance during a workout. To review their sensed biometric data, a user is normally required to interrupt, pause, or otherwise end their workout to review the collected data (e.g., by having to look down at a fitness tracker or to search for and then unlock another device to view the data). Additionally, conventional wearable devices that include a display require a user to raise up their device and/or physically interact with the wearable device to review the sensed data, which takes away from the user's experience and can impact a user's ability to work out effectively while also viewing biometric data. Further, because conventional wearable devices require user interaction (e.g., inputs to unlock devices, inputs to search for devices, then unlock devices, and then access applications that include the biometric data, and other interactions), a user is unable to conveniently access and use the sensed data to improve their performance of a physical activity.

Further, the use of artificial-reality devices and systems to assist with exercise activities is still in its early stages and has not been accepted or even tried by many consumers. Thus, explorations are needed around ways to present data (e.g., biometric data) from one device for presentation at an artificial-reality device to assist with exercise activities and doing so in a way to facilitates further adoption of such devices and systems.

As such, there is a need for a wearable device that coordinates the display of sensor data to a user without distracting the user or necessarily requiring user interaction.

SUMMARY

To avoid one or more of the drawbacks or challenges discussed above, artificial-reality systems (e.g., including a head-worn wearable device) that coordinate the display of sensor data received from one or more communicatively coupled devices, such as a wrist-wearable device, is disclosed. The head-worn wearable device (which can also be referred to more simply as a "head-worn device") presents the sensor data to a user without using a heads-up display or overhead display. More specifically, the head-worn wearable device displays the sensor data via an illumination source, such as a light-emitting diode (LED), that does not obstruct a user's view. In some embodiments, the head-worn wearable device detects when a user is performing a physical activity and requests from the one or more communicatively coupled devices, sensor data related to the physical activity (e.g., biometric data, position data, orientation data, movement data, etc.). Alternatively, in some embodiments, the head-worn wearable device receives an indication from the one or more communicatively coupled devices that the user is performing a physical activity and receives, from the one or more communicatively coupled devices, the sensor data. In some embodiments, the head-worn wearable device continuously monitors sensor data to determine whether the user is performing a physical activity. Alternatively, in some embodiments, the one or more communicatively coupled devices periodically provide sensor data to the head-worn wearable device to determine whether the user is performing a physical activity.

The head-worn wearable device uses the received and/or monitored sensor data to determine whether the sensor data satisfies a physiological-based threshold indicating that a representation of the sensor data would assist the user in performing the physical activity. For example, head-worn wearable device can determine that the sensor data indicates that the user is running at a target pace, the user is within a target heart rate zone, the user has reached a target lactate threshold, etc. The head-worn wearable device, in accordance with a determination that the sensor data satisfies a physiological-based threshold indicating that a representation of the sensor data would assist the user in performing the physical activity, can present, via at least one light-emitting diode of the head-worn wearable device, information about the biometric data that would assist the user in performing the physical activity. The light-based electrode can be illuminated in different colors, at different frequencies, and with different patterns, and can be used to communicate different messages to a user.

The head-worn wearable device can be used in real-world environments and/or in artificial reality (AR) environments, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. For example, the head-worn wearable device can provide variable light-based representations of a change in the user's performance of a physical activity while the user is performing the activity outdoors, such as running, or while the user is participating in an AR game (e.g., a virtual fitness game, a horror game, a roleplaying game, etc.).

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. The description may admit to other effective features as the person of skill in this art will appreciate upon reading this disclosure.

Figure 1A:
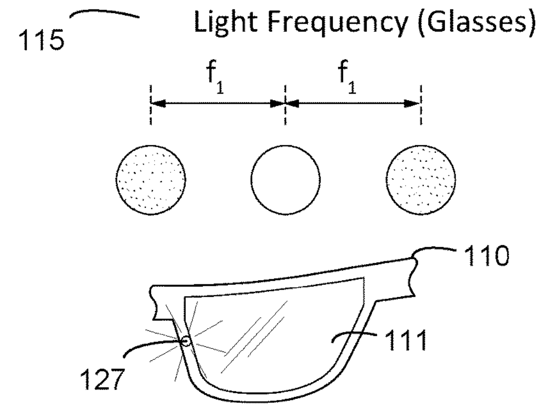
FIGS. 1A-1D illustrate coordinating display of biometric data at a head-worn wearable device based on sensor data from another device, in accordance with some embodiments.
Figure 1A:
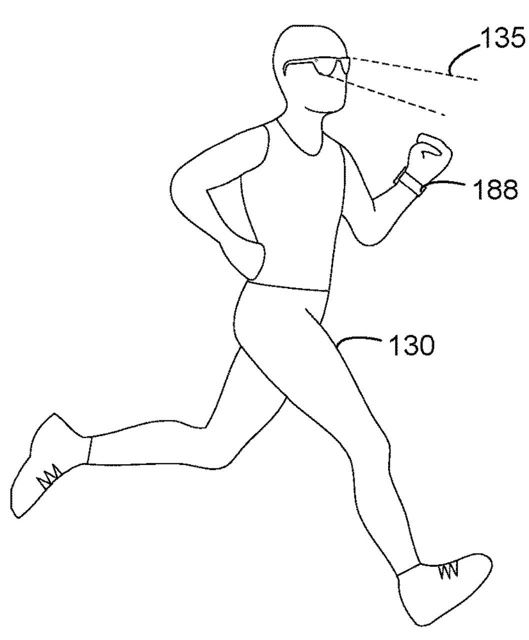
Figure 1A:
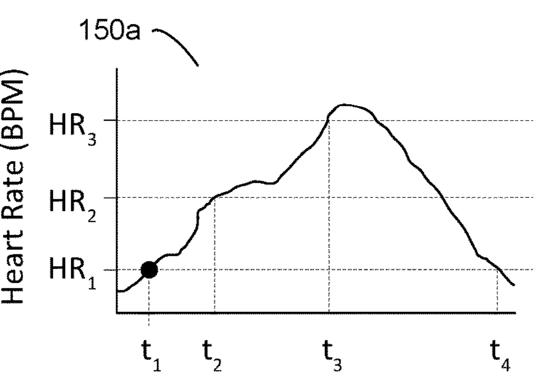

In accordance with common practice, the various features illustrated in the drawings are not drawn to scale. Accordingly, the dimensions of the various features may be arbitrarily expanded or reduced for clarity. In addition, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand or a combination of the user's hands. In-air means, in some embodiments, that the user hand does not contact a surface, object, or portion of an electronic device (e.g., the head-wearable device 110 or other communicatively coupled device, such as the wrist-wearable device 120), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

FIGS. 1A-1D illustrate coordinating display of biometric data at a head-worn wearable device based on sensor data from another device, in accordance with some embodiments. In some embodiments, the head-worn wearable device 110 is communicatively coupled to a wrist-wearable device 188 and/or another device (e.g., smartphone 774*b*, a PC 774*a*, tablet, workout tracking device, a server 770, or other device described below in reference to FIG. 7). In some embodiments, the head-worn wearable device 110 is communicatively coupled to more than one device (e.g., the wrist-wearable device 188, a smartphone 774*b*, standalone biometric sensors (or other fitness tracking device), and/or other devices). The head-worn wearable device 110 includes an light-emitting diode (LED) 127 for communicating different messages to a user 130 of the head-worn wearable device 110 and/or other people in proximity (e.g., within at least 5-10 meters) of the user 130 via a variable light-based representation of an activity. In some embodiments, the LED 127 is coupled with a housing of the head-worn wearable device 110 and/or with one or more lenses 111 of the head-worn wearable device 110. In some embodiments, one or more LEDs 127 can be positioned along distinct positions of then head-worn wearable device 110. For example, LED 127 is one of a plurality of LEDs positioned along the head-worn wearable device 110.

The head-worn wearable device 110 is configured to receive an indication that the user 130 (while wearing the head-worn wearable device 110) is performing a physical activity and, after receiving the indication, receive data (e.g., biometric data) sensed by a sensor of the wrist-wearable device 188 (e.g., a biometric sensor) and/or a sensor of another device during the user's performance of the physical activity. Additionally or alternatively, in some embodiments, head-worn wearable device 110 monitors data (e.g., biometric data) via one or more sensors included in the head-worn wearable device 110. The biometric data can include at least hydration data, an oxygen level data (e.g., oxygen saturation (SpO2)), heart rate data (e.g., resting heart rate and heart rate variability (HRV)), a stress data, skin or body temperature data, ambient temperature data, etc. In some embodiments, the head-worn wearable device 110 is configured to monitor, via one or more sensors, or receive (e.g., from the wrist-wearable device 188 or other device communicatively coupled to the head-worn wearable device 110) position data (e.g., location, altitude, travel distance, head position, distances between devices, etc.), movement data (e.g., velocity, acceleration, repetitions, steps, arm swing, etc.), orientation data (e.g., device position and/or user position sensed by inertial measurement units), posture data (e.g., user position with respect to the head-worn wearable device 110). In some embodiments, the position data, orientation data, and/or movement data are used to determine posture data (e.g., whether the user is standing upright, bending over, hunching their back, etc.). Additional examples of the different devices communicatively coupled to the head-worn wearable device 110 and sensors used to collect data are described below in reference to FIG. 7.

In some embodiments, the head-worn wearable device 110 is configured to determine a variable light-based representation of a change in the user's performance of the physical activity based on the sensor data monitored by the head-worn wearable device 110 and/or received from the wrist-wearable device 188 or other device. For example, the head-worn wearable device 110 can determine variable light-based representation of a change in the user's performance of the physical activity based on monitored and/or received biometric data, position data, movement data, posture data, etc. In some embodiments, the variable light-based representation of a change in the user's performance of the physical activity is based on satisfaction of one or more physiological-based thresholds.

The physiological-based thresholds include one or more of hydration thresholds (e.g., the user 130 consumed at least 64 oz of water, the user 130's water intake to sweat ratio is within a predetermined range, etc.), velocity/pace thresholds, oxygen level thresholds, heart rate zone thresholds or cardiovascular zone thresholds, stress thresholds, posture thresholds, etc. In some embodiments, one or more physiological-based thresholds are determined based on the user 130's physical activity history; defined by the user 130; and/or dynamically adjusted while the physically activity is being performed. For example, if the user 130 wants to be notified that they have reached a specific heart rate during their work out, the user 130 can define the one or more physiological-based thresholds such that the head-worn wearable device 110 provides, via the LED 127, a variable light-based representation to inform the user 130 that they have reached their target heart rate. Additionally, if the user 130 wants to keep their heart-rate in a specific zone, the head-worn wearable device 110 can provide, via the LED 127, a variable light-based representation of the user's performance of the physical activity to inform the user 130 that they are within the specific zone, exceeded the specific zone, or are below the specific zone.

The variable light-based representation of a change in the user's performance of the physical activity is configured to help the user 130 complete a physical activity, train, achieve a target performance, beat a personal record, maintain a proper and safe posture, etc. In some embodiments, the variable light-based representation of a change in the user's performance of the physical activity dynamically changes as the user performs the activity, progresses through their workout, performs different physical activities, etc. The variable light-based representation can include, but is not limited to, a strobe light, a steady light, varying colors, user defined light patterns or colors (e.g., three rapid flashes, two rapid flashes followed by a delayed third flash, etc.), communicative patterns such as morse code, etc. The head-worn wearable device 110 is configured to provide instructions to the LED 127 for generating the variable light-based representation responsive to one or more physiological-based thresholds being satisfied. As shown in FIG. 1A, the user 130 initiates a workout while using a wrist-wearable device 188 and a head-worn wearable device 110. When the user 130 starts a workout, such as a run, the head-worn wearable device 110 receives biometric data from the wrist-wearable device 188 (that includes one or more biometric sensors for sensing biometric data), and causes the LED 127 to illuminate (providing the variable light-based representation) in different patterns, in different colors, at different frequencies, etc. to communicate different messages to the user while the user is performing the physical activity.

For example, the head-worn wearable device 110 can receive biometric data, including a heart rate, from the wrist-wearable device 188 or other device communicatively coupled to the head-worn wearable device 110, and use the biometric data to determine a color, frequency and/or pattern with which to illuminate the LED 127. The head-worn wearable device 110 can determine a color, frequency and/or pattern with which to illuminate LED 127 based on the user 130's heart rate (e.g., $HR_1$, $HR_2$, $HR_3$) and one or more physiological-based thresholds for the user 130. More specifically, in accordance with a determination that the biometric data satisfies a physiological-based threshold indicating that a representation of the biometric data would assist the user in performing the physical activity, the head-worn wearable device 110 causes the LED 127 to provide a variable light-based representation of the user 130's performance of the physical activity corresponding to the satisfied physiological-based threshold. The above examples are non-limiting. As the skilled artisan will appreciate upon reading the descriptions provided herein, different biometric data or device can be used to determine one or more satisfied physiological-based thresholds. For example, in some embodiments, a time duration (e.g., $t_1$, $t_2$, $t_3$, $t_4$), a distance, an altitude, $O_2$ stats, skin temperature, ambient temperature, user posture or other ergonomic indicators, hydration, velocity/pace, stress, etc. can be used to determine that one or more physiological-based thresholds are satisfied.

In some embodiments, the LED 127 is configured such that only the user 130 can view the variable light-based representation (e.g., presented without obstructing the user 130's view (e.g., field of view 135)). This allows the user 130 to monitor their performance in real-time and make any adjustments needed to improve their performance, correct their posture to avoid injuries, control their pace or exerted energy levels to assist the user 130 in completing the workout, and/or make any other improvements in the performance of a physical activity. In some embodiments, the LED 127 is configured such that the user 130 and other people in proximity of the user 130 can view the variable light-based representation. This allows the user 130 to share their current performance with friends and/or instructors (e.g., to provide coaches or personal trainers with a visual representation of the user 130's current physiological state to guide a workout), as well as enable the user to communicate with others (e.g., inform others that the user does not want to be disturbed, or inform others that the user 130 is hurt or needs assistance, etc.). In some embodiments, the LED 127 is configured such that only other people in proximity of the user 130 can view the variable light-based representation. This allows the user 130 to provide others with a busy or do not disturb notification, inform other that no assistance is needed, inform other that assistance is needed, etc. In some embodiments, the user 130 can select whether the variable light-based representation should be visible only to them, to them and those in proximity, or only to those in proximity. Different examples of the variable light-based representations are provided in FIGS. 1A-1D.

In FIG. 1A, the user 130 is shown as they initiate their workout (or physical activity). The user 130's physical activity is represented by a first heart rate plot 150*a*, which includes at least three physiological-based thresholds (HR $Threshold_1$, HR $Threshold_2$, and HR $Threshold_3$) for the user 130's heart rate (e.g., $HR_1$, $HR_2$, and $HR_3$). As the user 130 participates in their workout, the wrist-wearable device 188 (or other device communicatively coupled to the head-worn wearable device 110) monitors the user 130's biometric data and provides the sensed biometric data to the head-worn wearable device 110. At $t_1$, the head-worn wearable device 110 determines that the user 130's heart rate satisfies a first physiological-based threshold (HR $Threshold_1$) and provides a first variable light-based representation of a change in the user's performance of the physical activity (e.g., first variable light frequency 115). In particular, the LED 127 illuminates at frequency alerting the user that they have reached a first target heart rate threshold (e.g., HR $Threshold_1$).

Figure 1B:
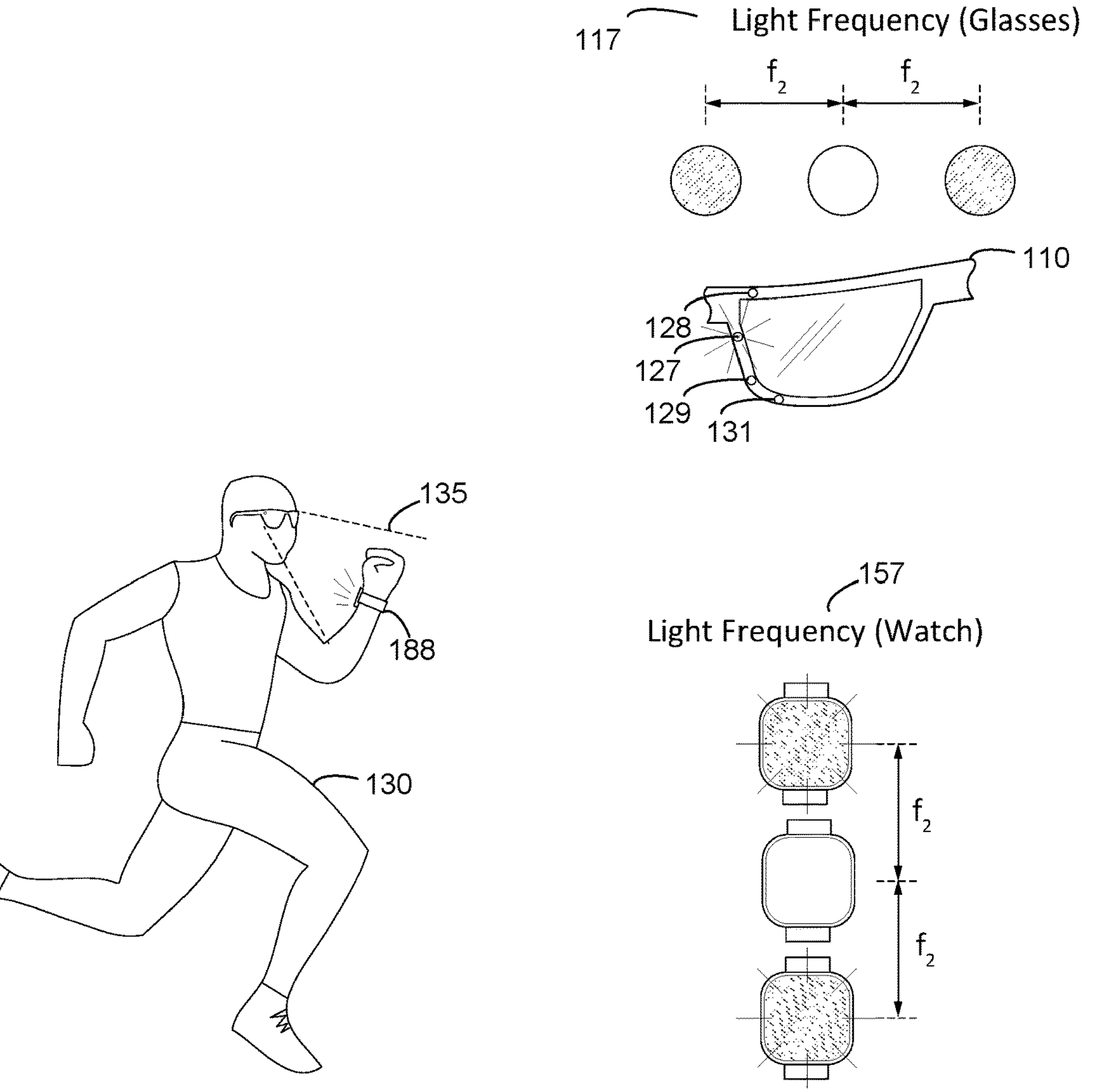
Figure 1B:
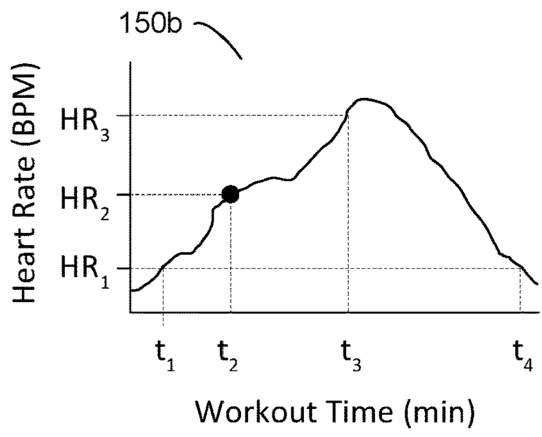

In FIG. 1B, the user 130 is shown in the middle of their workout. The user 130's physical activity is represented by a second heart rate plot 150*b*. At $t_2$, the head-worn wearable device 110 determines that the user 130's heart rate satisfies a second physiological-based threshold (HR $Threshold_2$) and provides a second variable light-based representation of a change in the user's performance of the physical activity (e.g., second variable light frequencies 117). In particular, the LED 127 illuminates at frequency $f_2$, alerting the user that they have reached a second target threshold (e.g., HR $Threshold_2$). In some embodiments, the head-worn wearable device 110 can have a plurality of LEDs (e.g., 127, 128, 129, and 131). In some embodiments, one or more LEDs of the plurality of LEDs (e.g., 127, 128, 129, and 131) are positioned at the same or distinct positions of the head-worn wearable device 110. Each of one or more LEDs of the plurality of LEDs can be independently controlled such that each LED can provide a variable light-based representation with a respective color, frequency, pattern, etc.

In some embodiments, the wrist-wearable device 188 (or other device communicatively coupled to the head-worn wearable device 110, described below in reference to FIG. 7) can also be caused to illuminate, using respective illumination sources, such as a LED or a display, with the same variable light-based representation (e.g., at frequency $f_2$) or with a distinct variable light-based representation, alerting the user that they have reached the second target threshold or a distinct target threshold (e.g., reached daily workout duration goal). In some embodiments, the wrist-wearable device 188 (or other device communicatively coupled to the head-worn wearable device 110) is configured to illuminate with a variable light-based representation when the user 130 is focused on the wrist-wearable device 188 (or other device). Focused, for purposes of this disclosure, means that the user 130 is interacting with the device and/or looking at the device. For example, as shown in FIG. 1B, when the user 130 looks at the wrist-wearable device 188 (e.g., represented by wrist-wearable device 188 within field of view 135), the wrist-wearable device 188 illuminates at frequency $f_2$ (e.g., watch variable light frequencies 157), alerting the user that they have reached a second target threshold (e.g., HR $Threshold_2$). In some embodiments, the illumination sources of the wrist-wearable device 188 or other device communicatively coupled to the head-worn wearable device 110 include displays 720 of the respective devices, LEDs, or other light sources.

Figure 1C:
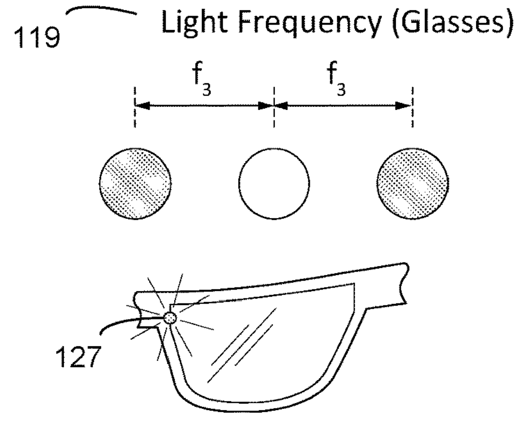
Figure 1C:
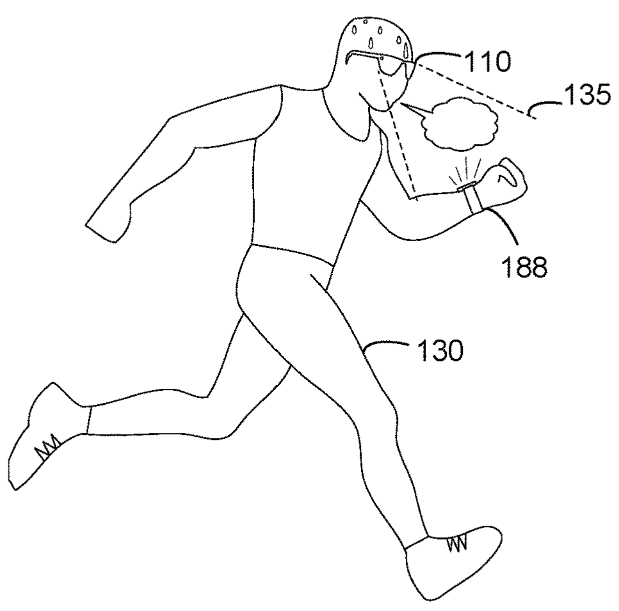
Figure 1C:
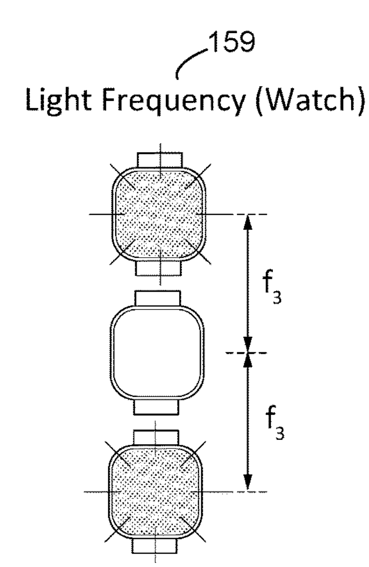
Figure 1C:
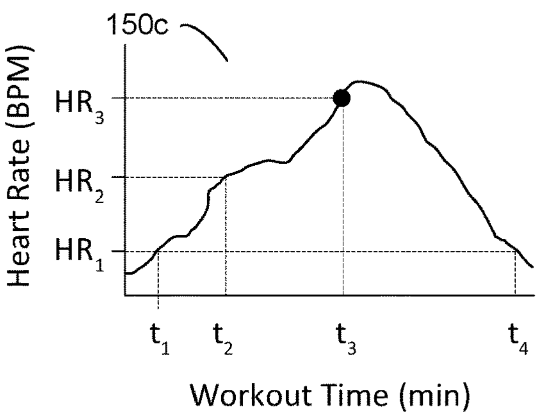

In FIG. 1C, the user 130 is shown near the peak of their workout. The user 130's physical activity is represented by a third heart rate plot 150*c*. At $t_3$, the head-worn wearable device 110 determines that the user 130's heart rate satisfies a third physiological-based threshold (HR $Threshold_3$) and provides a third variable light-based representation of a change in the user's performance of the physical activity (e.g., third varying light frequencies 119). In particular, the LED 127 illuminates at frequency $f_3$, alerting the user that they have reached the third physiological-based threshold. In some embodiments, a variable light-based representation provided by the wrist-wearable device 188 (or other device communicatively coupled to the head-worn wearable device 110) is also updated based on a change in the user's biometric data. When the user focuses on the wrist-wearable device 188 (or other device), the wrist-wearable device 188 (or other device) is caused illuminate with the updated variable light-based representation (e.g., at frequency $f_3$ as shown by watch variable light frequencies 159).

In some embodiments, the LED 127 is caused to illuminate towards other people in proximity of the user 130. The signal can use used to signal to others that the user does not want to be disturbed, if the user needs assistance, if the user does not need assistance, and/or to share their workout with friends. As an example, in FIG. 1C, the user is deep into their workout and may be fatigued or dehydrated. The head-worn wearable device 110 can determine, based on received or monitored biometric data, that a physiological-based thresholds associated with exhaustion and/or dehydration is satisfied and, in response to a determination that the physiological-based thresholds associated with exhaustion and/or dehydration satisfied, cause the LED 127 to provide a variable light-based representation to those in proximity to the user indicating that the user needs assistance.

Figure 1D:
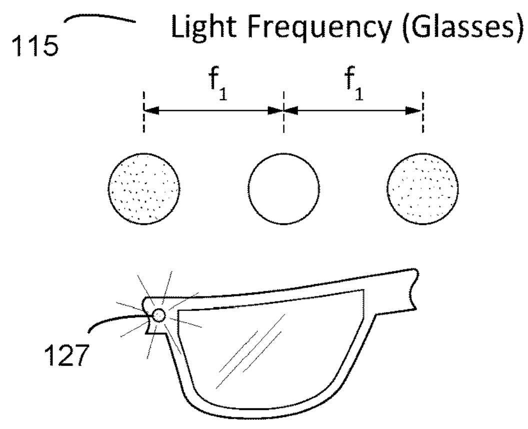
Figure 1D:
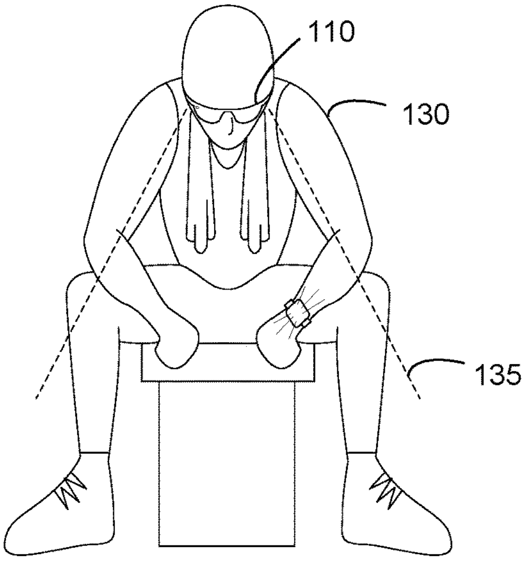
Figure 1D:
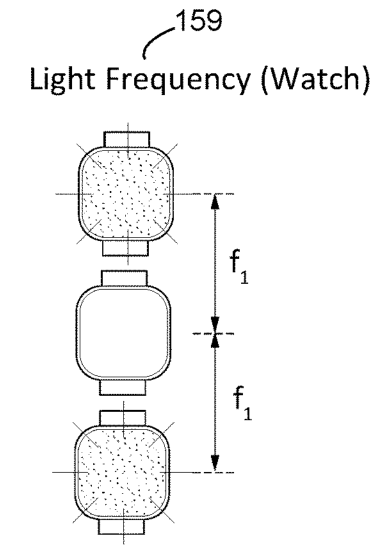
Figure 1D:
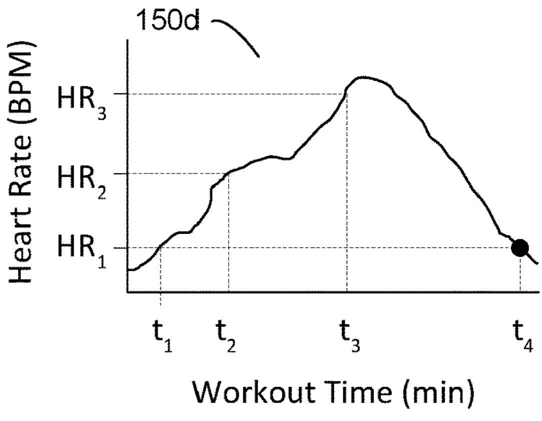

In FIG. 1D, the user 130 is shown during a cooldown period. The user 130's physical activity is represented by a fourth heart rate plot 150*d*. At $t_4$, the head-worn wearable device 110 determines that the user 130's heart rate returns to the first physiological-based threshold (HR $Threshold_1$) and provides the first variable light-based representation of a change in the user's performance of the physical activity (e.g., first variable light frequencies 115). In particular, the LED 127 illuminates at frequency $f_1$, alerting the user that they have reached the $HR_1$ threshold. In some embodiments, the wrist-wearable device 188 (or other device communicatively coupled to the head-worn wearable device 110) can also illuminate at the same ($f_1$) or similar frequency as described above.

FIGS. 2A-2D illustrate coordinating display of exercise-guidance information to a user of a head-worn wearable device based on data other than biometric data, in accordance with some embodiments. The head-worn wearable device 110 includes one or more components and is configured to perform one or more functions described above in reference to FIGS. 1A-1D. Any data that is sensed by the one or more sensors of the head-worn wearable device 110 and/or an electronic device communicatively coupled with head-worn wearable device 110, such as a wrist-wearable device 188, can be used to determine whether a physiological-based threshold is satisfied. In some embodiments, the head-worn wearable device 110 is further configured to provide guidance to a user based on sensed, monitored, and/or received sensor data. The guidance can include illuminating a LED with a particular color, pattern, and/or frequency to assist the user in performing the physical activity. In some embodiments, the guidance includes providing audio feedback (e.g., via a speaker of the head-worn wearable device 110 or a speaker communicatively coupled with the head-worn wearable device 110).

Figure 2A:
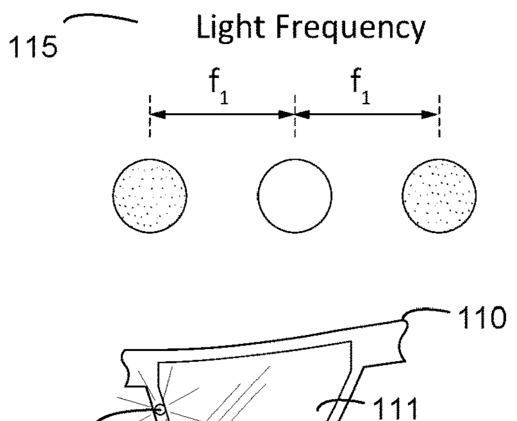
FIGS. 2A-2D illustrate coordinating display of exercise-guidance information to a user of a head-worn wearable device based on data other than biometric data, in accordance with some embodiments.
Figure 2A:
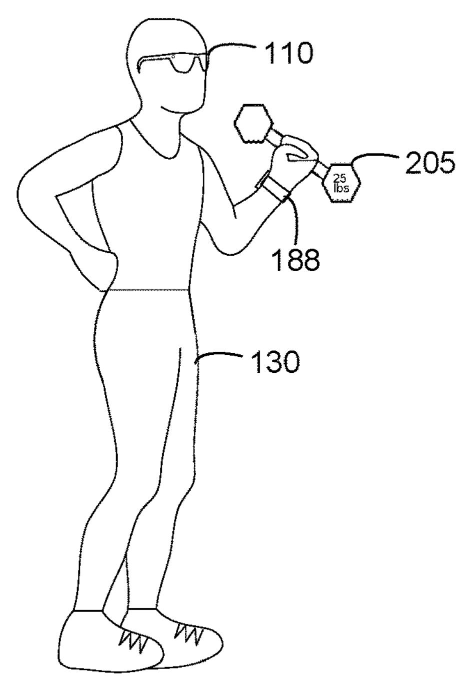
Figure 2A:
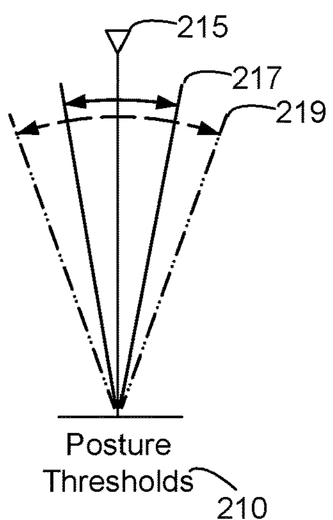

In FIG. 2A, a user 130 is shown working out and using sensed data displayed by the head-worn wearable device to assist in the performance of the physical activity (e.g., lifting heavy weight 205). The one or more sensors of the head-worn wearable device and/or the wrist-wearable device 188 are used to obtain and/or monitor data while the user is performing a physical activity. For example, as the user 130 workouts out, the wrist-wearable device 188 (and/or other devices communicatively coupled to the head-worn wearable device 110 as described below in reference to FIG. 7) monitors the user 130's position and orientation data and provides the sensed position and orientation data to the head-worn wearable device 110. The head-worn wearable device 110 (and/or other communicatively coupled devices) can determine whether the user 130's position and orientation data satisfy physiological-based thresholds (e.g., posture thresholds 210). Although the above example describes the use of position and orientation data sensed by one or more sensors of the wrist-wearable device 188, the skilled artisan will appreciate upon reading the descriptions provided herein, that position and orientation data sensed by one or more sensors of the head-worn wearable device can be used to determine whether the user 130's position and orientation data satisfies physiological-based thresholds.

The posture thresholds 210 can include one or more thresholds that are used to provide guidance with respect to a user 130's posture. For example, the posture thresholds 210 can include a first posture threshold 217 that is used to determine whether the user is standing upright, has a straight back, and/or is otherwise maintaining a safe workout posture, and a second posture threshold 219 that is used to determine whether the user is hunched over, has a bent back, and/or is otherwise has an unsafe or high-risk (of injury) posture.

Based on a determination that one or more physiological-based thresholds are satisfied, the head-worn wearable device 110 is caused to illuminate a LED 127 to assist and/or provide guidance to the user in the performance of the physical activity. For example, the head-worn wearable device 110 can determine that the user 130's current posture 215 is within the first posture threshold 217 and cause the LED 127 to illuminate at a first variable light frequency 115, $f_1$, to alert the user 130 that they are maintaining a safe posture (e.g., are not hunched over or bending their back).

Figure 2B:
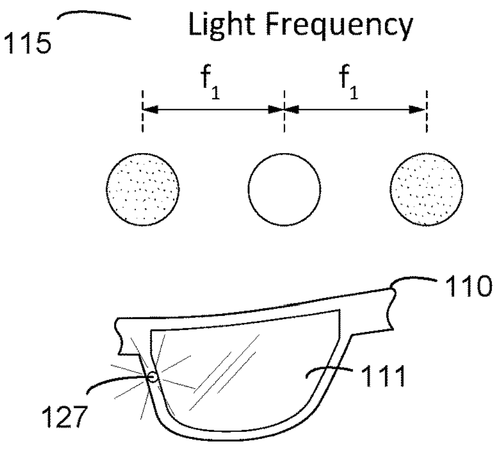
Figure 2B:
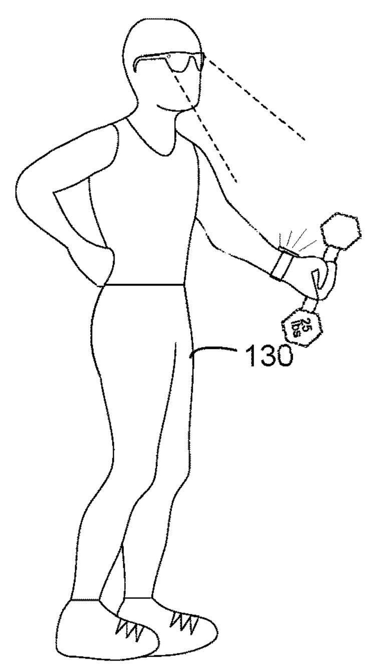
Figure 2B:
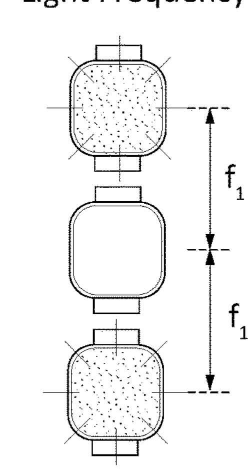
Figure 2B:
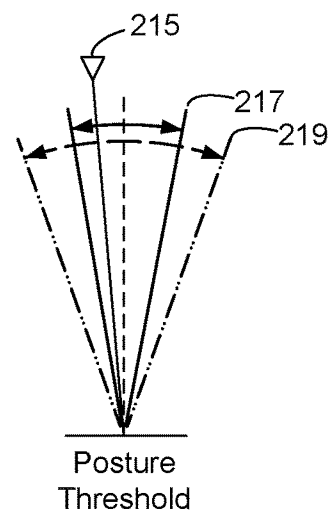

In FIG. 2B, the user 130 is shown further into their workout. The user 130 continues to use sensed data displayed by the head-worn wearable device to assist in the performance of the physical activity. As shown in FIG. 2B, the head-worn wearable device 110 determines that the user 130's current posture 215 is still within the first posture threshold 217 and cause the LED 127 to continue to illuminate at the first variable light frequency 115, $f_1$, to alert the user that they are maintaining a safe posture. In some embodiments, if it is determined that the user 130 is focused on the wrist-wearable device 188 (or other device), an illumination source of the wrist-wearable device 188 is caused to illuminate with the same variable light-based representation (e.g., at frequency $f_1$ as shown by watch variable light frequencies 257) or with a distinct variable light-based representation, alerting the user that they are maintaining a safe posture.

Figure 2C:
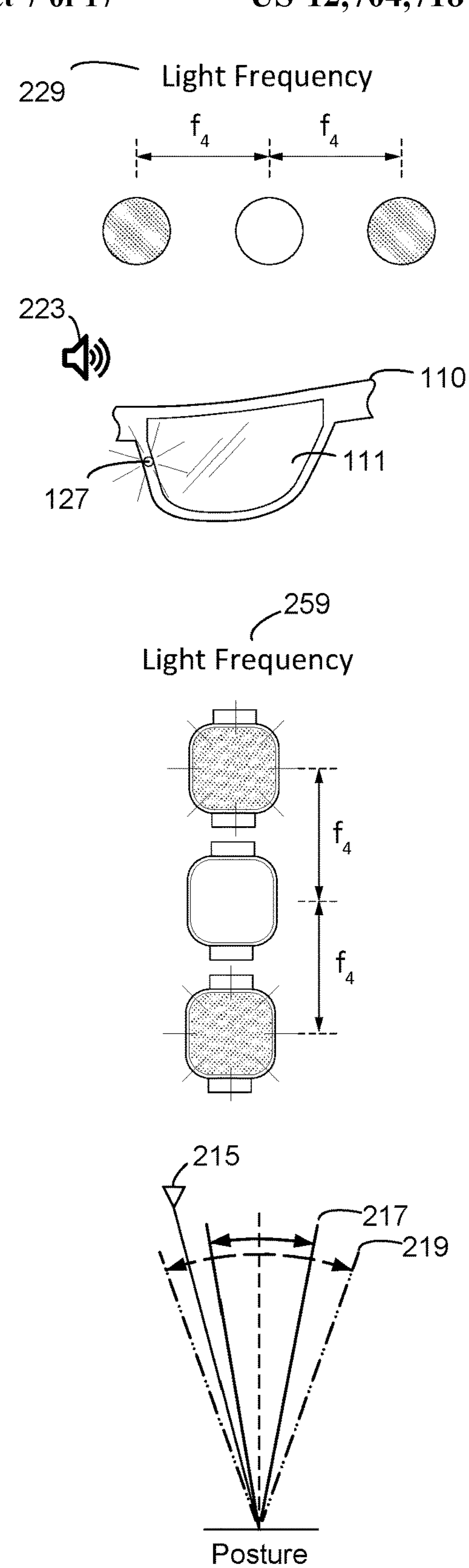

Turning to FIG. 2C, the user 130 is shown at even further into their workout. In particular, the user is shown tired and/or exhausted while performing a physical activity, which results in the user 130's posture or workout form to change from a safe posture to a high-risk posture. The change in the user 130's posture is detected by the one or more sensors of the head-worn wearable device 110 and/or devices communicatively coupled with the head-worn wearable device 110. When the user 130's current posture 215 is determined to satisfy the second posture threshold 219, the head-worn wearable device is caused to illuminate the LED 127 at another variable light frequency 229, $f_4$, to alert the user 130 that their posture has changed from a safe posture to a high-risk posture. As described above in reference to FIG. 2B, in some embodiments, an illumination source of the wrist-wearable device 188 is caused to illuminate with the same variable light-based representation (e.g., watch variable light frequencies 259 at frequency $f_4$) or with a distinct variable light-based representation, alerting the user 130 of their current posture 215.

Alternatively or in addition, in some embodiments, the head-worn wearable device 110 (or other device communicatively coupled with the head-worn wearable device) is caused to provide audio feedback via one or more speakers 223. The audio feedback provides guidance to the user 130 to assist the user 130 in performing the physical activity. In some embodiments, the guidance provides recommendations to the user 130, such as suggesting the user 130 to take a break, decrease the weight, hydrate, stand up straight, correct their posture, etc. In some embodiments, the audible feedback is provided for positioning guidance. In some embodiments, the audible feedback is only presented to the user 130 when the user 130 is wearing headphones communicatively coupled with the head-worn wearable device 110. In this way, the user 130's privacy is protected by not providing the audio feedback while others are near the user 130 (e.g., in situations that the user 130 does not want the exercise guidance to be announced using the speaker). Additional information on the one or more speakers is provided below in reference to FIG. 4.

Figure 2D:
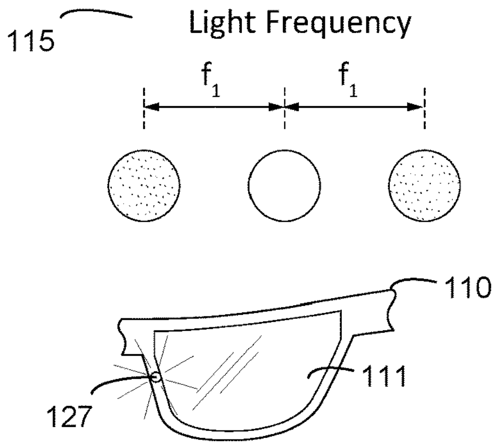
Figure 2D:
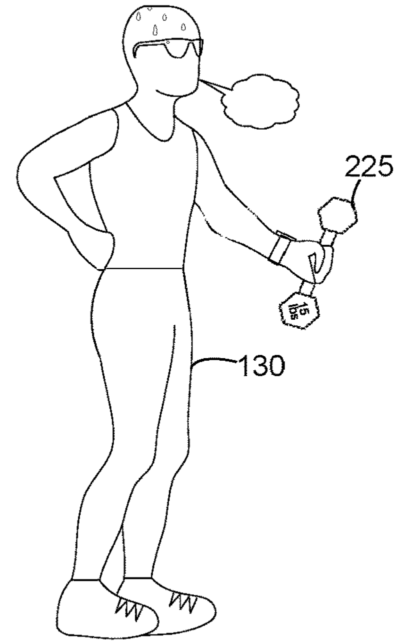
Figure 2D:
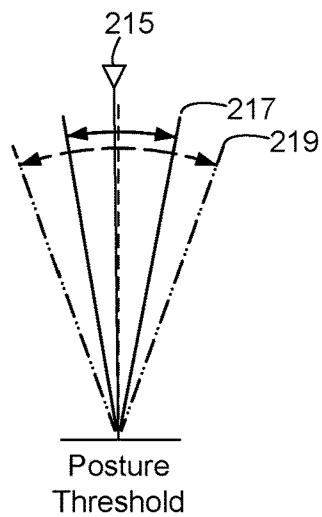

In FIG. 2D, the user 130 corrects their posture in accordance with the guidance provided by the head-worn wearable device 110. In particular, the user has decreased the exercise weight (e.g., from a heavy weight 205 to a light weigh 225). The decrease in exercise weight allows the user 130 to correct their posture such that the user 130's current posture 215 is within the first posture threshold 217. As a result of the user 130 correcting their posture, the LED 127 of the head-worn wearable device is caused to illuminate at a first variable light frequency 115, $f_1$, alerting the user 130 that they are working out with a safe posture (e.g., are not hunched over or bending their back).

The example guidance described above in FIG. 1A-2D is non-limiting. In some embodiments, the LED 127 is caused to illuminate to provide a user with directions, instructions, operate as a timer, and provide any other additional information to the user to assist in the performance of the physical activity. For example, while the user is jogging outside, the LED can be configured to illuminate once to instruct the user 130 to turn left, illuminate twice to instruct the user 130 to turn right, illuminate in a steady color (e.g., blue) to instruct the user 130 to keep moving forward, illuminate red to warn the user of unsafe event (e.g., mugging reported nearby). In some embodiments, LEDs 127 positioned at different portions of the head-worn wearable device are illuminated (e.g., an LED positioned on the left of the head-worn wearable device 110 is illuminated to instruct the user to turn left, an LED positioned on the right of the head-worn wearable device 110 is illuminated to instruct the user to turn right, etc.). As described above in FIGS. 2A-2D, in some embodiments, the head-worn wearable device is configured to provide audio feedback in conjunction with or instead of illuminating the LED 127.

Figure 3:
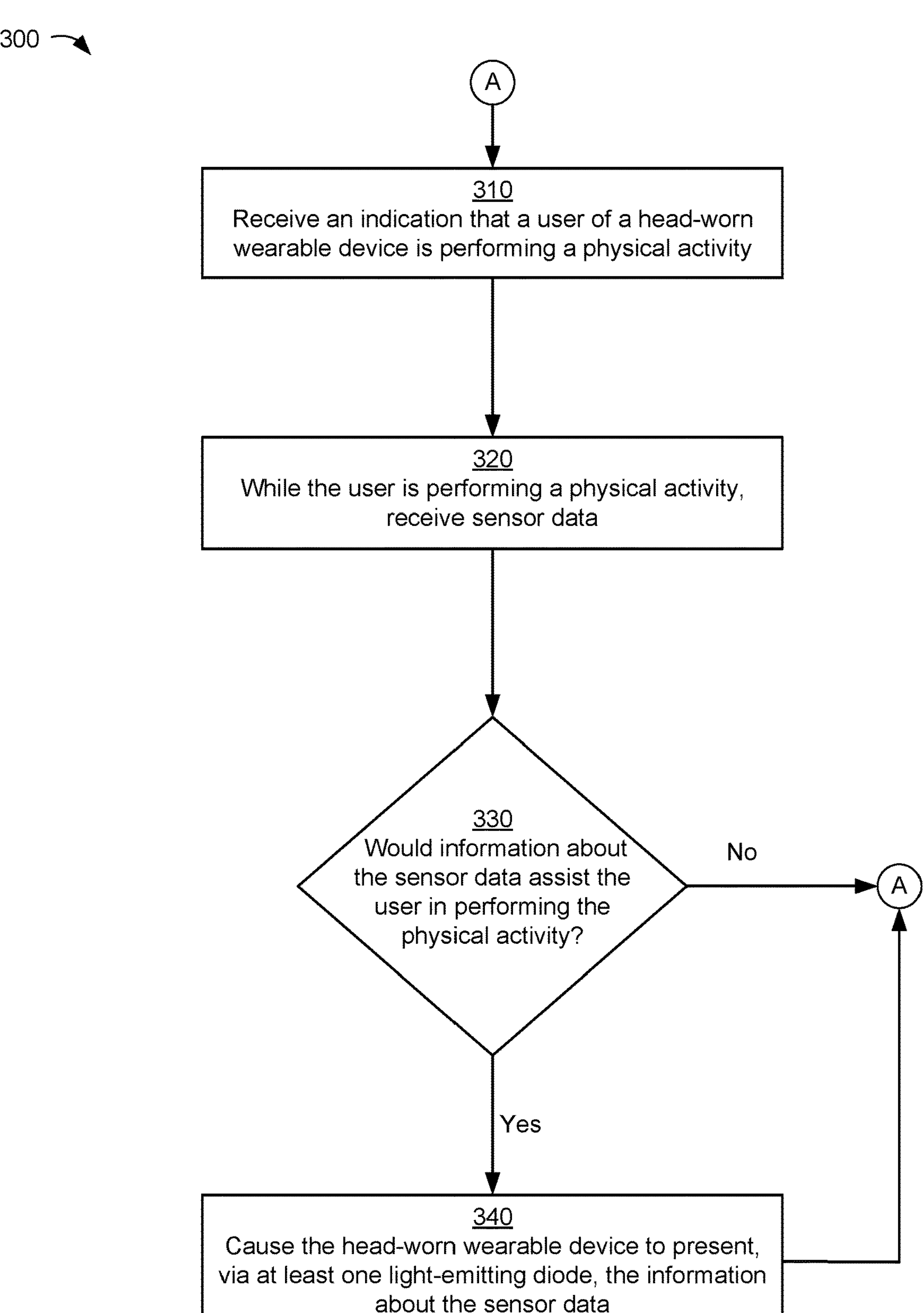
FIG. 3 is a flow diagram illustrating a method of coordinating display of data at a head-worn wearable device based on sensor data from another device, in accordance with some embodiments.

FIG. 3 is a flow diagram illustrating a method of coordinating display of data at a head-worn wearable device based on sensor data from another device, in accordance with some embodiments. Operations (e.g., steps) of the method 300 can be performed by one or more processors of one or more devices described below in reference to FIG. 7 (e.g., a computer 774*a*, a smartphone 774*b*, a controller 774*c*, a head-worn wearable device 110, a wrist-wearable device 188, etc.). In some embodiments, the head-worn wearable device 110 device is communicatively coupled with one or more sensors (e.g., various sensors 725 described below in reference to FIG. 7), an imaging device 755, a microphone, and a speaker to perform the one or more operations. In some embodiments, the head-worn wearable device 110 is communicatively coupled with a display 720 (FIG. 7). At least some of the operations shown in FIG. 3 correspond to instructions stored in a computer memory or computer-readable storage medium (e.g., memory 760; FIG. 7). Operations of the method 300 can be performed by a single device (e.g., a head-worn wearable device 110) or at least two devices communicatively coupled to one another (e.g., the head-worn wearable device 110 and a wrist-wearable device 188, a smartphone, a computer, a server 770, etc.). Additionally or alternatively, operations of the method 300 can be performed by instructions stored in memory or computer-readable medium of another device communicatively coupled to one or more devices described above in reference to FIG. 7.

The method 300 includes receiving (310) an indication that a user of a head-worn wearable device is performing a physical activity. The indication can be received from a wrist-wearable device 188 or any other device communicatively coupled to the head-worn wearable device 110. For example, as described above in reference to FIGS. 1A-1D, the head-worn wearable device 110 can receive indications at different points of a user 130's workouts. In some embodiments, the head-worn wearable device 110 continuously receives indications while the user 130 is performing the physical activity. In some embodiments, the head-worn wearable device 110 receives indications at predetermined intervals (e.g., 1 second, 10 seconds, 30 seconds, etc.).

The method 300 includes while the user is performing a physical activity, receiving (320) sensor data. The sensor data can be received at the head-worn wearable device from a communicatively coupled electronic device during the user's performance of the physical activity. For example, in FIGS. 1A-1D, the wrist-wearable device 188 provides the head-worn wearable device 110 biometric data from one or more sensors. The head-worn wearable device can receive any sensor data that can be used to determine whether one or more physiological-based thresholds are satisfied or any sensor data that can be used to assist the user in performing the physical activity. The sensor data can include biometric data (e.g., oxygen levels, heart rate, body temperature, etc.), position data (e.g., device position data (relative to the head-worn wearable device 110), location data, etc.), movement data (e.g., acceleration, velocity, etc.), environmental data (e.g., temperature, altitude, etc.), and/or other sensor data described below in reference to FIG. 7.

The method 300 also includes determining (330) whether information about the sensor data assist the user in performing the physical activity. In response to a determination that information about the sensor data would assist the user in performing the physical activity ("Yes" at operation 330), the method 300 includes causing (340) the head-worn wearable device to present, via at least one LED, the information about the sensor data. As described above in reference to FIGS. 1A-1D, the information about the sensor data can be a LED 127 that is illuminated at different frequencies, with different patterns, with different colors, etc. In some embodiments, the head-worn wearable device 110 does not include a display, head-up display, overhead display, etc. In other words, the head-worn wearable device 110 presents the information without a display.

The information about the sensor data can communicate different messages to the user that can be used by the user to improve their performance of a physical activity and/or assist the user in performing a physical activity. For example, the information about the sensor data can be a light illuminated with a green hue to inform the user that they are within their target heart rate, within their target running pace, performing the target workout type (e.g., Aerobic vs. Anaerobic), performing a workout with a proper posture (e.g., upright instead of hunched over), on track to beat a personal record, improved performance metric (e.g., improved lactate threshold), etc. Similarly, the information about the sensor data can be a light illuminated with a yellow hue to inform the user that they are no longer within their target heart rate, are outside of their target running pace, etc. Additionally, the information about the sensor data can be a light illuminated with a red hue to inform the user that they are dehydrated, at risk of injury (e.g., have improper posture), at an unsafe heart rate for an extended period of time, etc. The above examples are non-limiting. The variable light-based representation can be a light illuminated with any color, at different frequencies (e.g., steady light, strobe, predetermined intervals, etc.), with different patterns (e.g., at least two flashes, at least three flashes, morse code, etc.). The information about the sensor data can be generated to assist the user 130 in the performance of any physical activity, such as running, cycling, weight training, walking, yoga, etc. Similarly, the information about the sensor data can be generated to assist the user 130 in day-to-day activities, such as reminding the user 130 to drink water, reminding the user 130 to sit upright, the user 130 to stand periodically, etc.

After causing the head-worn wearable device to present, via the at least one LED, the information about the sensor data, the method 300 returns to operation (310) and awaits a new (or ongoing) indication that a user of a head-worn wearable device is performing a physical activity.

Returning operation 330, in response to a determination that the information about the sensor data would not assist the user in performing the physical activity ("No" at operation 330), the method 300 returns to operation (310) and awaits a new (or ongoing) indication that a user of a head-worn wearable device is performing a physical activity.

Figure 4:
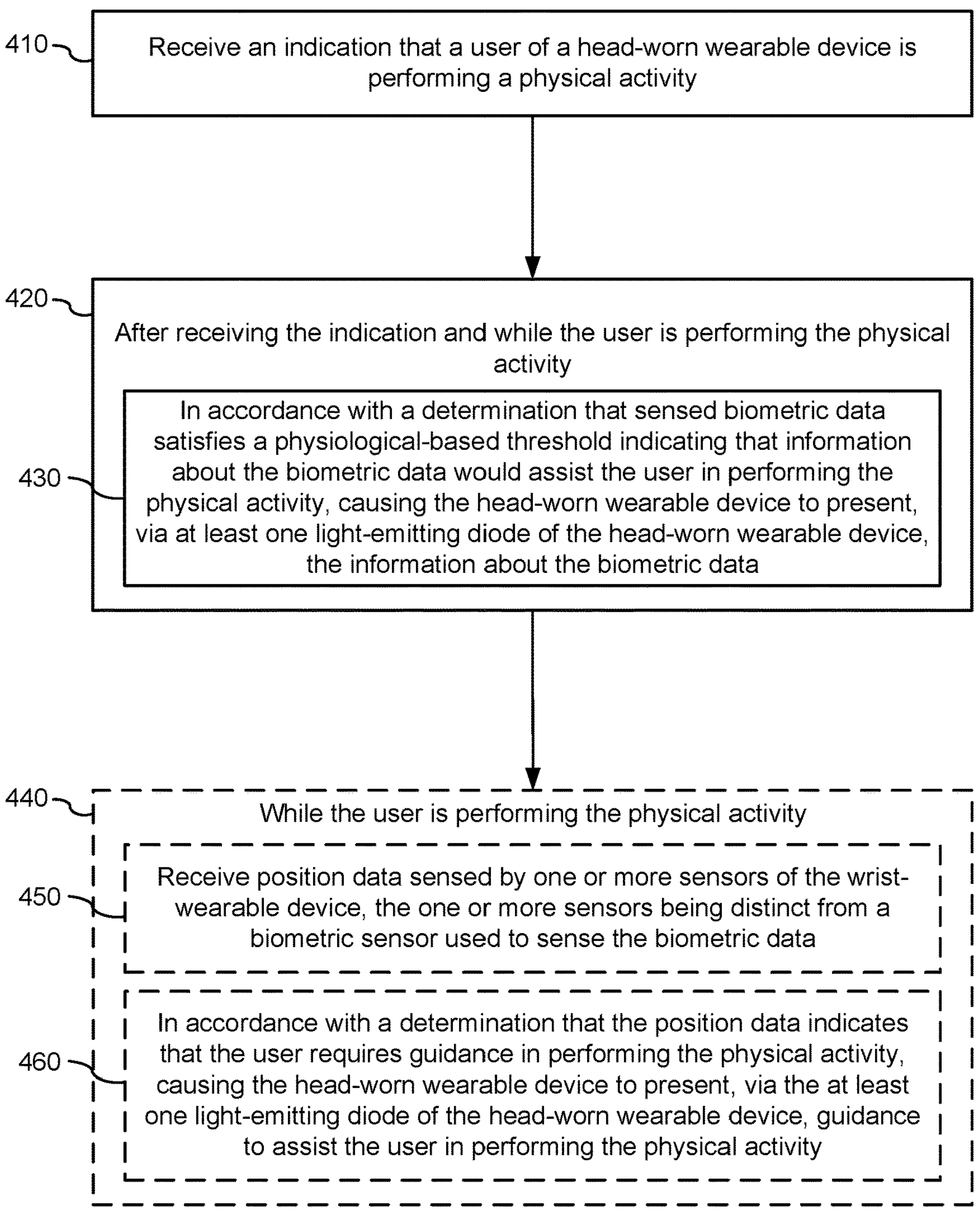
FIG. 4 is a detailed flow diagram illustrating a method of coordinating display of biometric data, in accordance with some embodiments.

FIG. 4 is a detailed flow diagram illustrating a method of coordinating display of biometric data, in accordance with some embodiments. Similar to method 300 of FIG. 3, operations of the method 400 can be performed by one or more processors of the one or more devices described below in reference to FIG. 7. At least some of the operations shown in FIG. 4 correspond to instructions stored in a computer memory or computer-readable storage medium. Operations of the method 400 can be performed by a single device or at least two devices communicatively coupled to one another. Additionally or alternatively, operations of the method 400 can be performed by instructions stored in memory or computer-readable medium of another device communicatively coupled to one or more devices described above in reference to FIG. 1. For ease, method 400 is described as being performed at a head-worn wearable device 110 (FIGS. 1A-1D).

Method 400 includes receiving (410) an indication that a user of a head-worn wearable device is performing a physical activity. In some embodiments, the head-worn wearable device 110 includes at least one LED 127 visible to the user while wearing the head-worn wearable device. The head-worn wearable device can be in communication with an electronic device worn or carried by the user during the physical activity that is configured to sense at least biometric data for the user during the physical activity. For example, in some embodiments, an electronic device communicatively coupled to the head-worn wearable device 110 can be a wrist-wearable device 188, a smartphone 774*b*, fitness tracker, or other device described below in reference to FIG. 7, and can provide an indication that the user 130 of the head-worn wearable device 110 is performing a physical activity based on sensor data.

In some embodiments, a determination that the user of the head-worn wearable device is performing a physical activity is based on one or more of position data, orientation data (e.g., electronic device orientation, user hand orientation, and/or other posture data measured by an inertial measurement unit), biometric data, and/or other data sensed by the one or more sensors of communicatively coupled devices described below in reference to FIG. 7. For example, as shown and described above in FIGS. 1A-2D, the wrist-wearable device 188 can monitor sensed data, such as biometric data, and determine that the user is performing and activity, after the wrist-wearable device 188 determines that the user is performing an activity it provides the sensed data to the head-worn wearable device 110. In some embodiments, an electronic device communicatively coupled to the head-worn wearable device 110 periodically sends sensed data to the head-worn wearable device 110. The sensor data used to determine that the user of the head-worn wearable device is performing a physical activity is described in reference to FIGS. 1A-2D and 7.

Alternatively or additionally, in some embodiments, the determination that the user of the head-worn wearable device is performing a physical activity is based on an input command provided by the user 130 at the communicatively coupled device. The input commands can include hand gestures (detected by one or more cameras and/or one or more sensors), voice commands, touch input commands, actuation of one or more buttons, etc. The above examples are non-limiting.

In in some embodiments, method 400 includes determining, by the head-worn wearable device 110 based on sensor data monitored by the head-worn wearable device 110, that the user is performing a physical activity. In some embodiments, the determination that the user of the is performing a physical activity is based on one or more of position data sensed by one or more sensors of the head-worn wearable device 110 and/or biometric data sensed by a biometric sensor of the head-worn wearable device 110. Alternatively or additionally, in some embodiments, the determination that the user of the head-worn wearable device 110 is performing a physical activity is based on an input command provided by the user 130 at the communicatively coupled device. Additional sensor data described below in reference to FIGS. 1A-2D and 7 can be used to determine that the user of the head-worn wearable device is performing a physical activity. In some embodiments, responsive to a determination that the user of the head-worn wearable device 110 is performing a physical activity, the method 400 includes requesting, by the head-worn wearable device 110, sensor data from a communicatively coupled device, such as a wrist-wearable device 188; a smartphone 774*b*; fitness tracker; or other device described below in reference to FIG. 7. The requested sensor data is used to determine whether a physiological-based threshold indicating that a representation of the sensor data would assist the user in performing the physical activity is satisfied, as discussed below.

Method 400 includes after receiving the indication and while the user is performing the physical activity (420), in accordance with a determination that the biometric data (and/or other sensed data) satisfies a physiological-based threshold indicating that information about the biometric data (and/or other sensed data) would assist the user in performing the physical activity, causing (430) the head-worn wearable device to present, via the at least one LED, the information about the biometric data (and/or other sensed data that would be helpful to the user). The physiological-based threshold is associated with a type of the physical activity performed by the user 130. Different information can be provided to the user 130 based on the physiological-based threshold satisfied. For example, biometric data sensed by a wrist-wearable device can be biometric data of a first type and at least one different physiological-based threshold, distinct from the physiological-based threshold, can be used to determine when to cause presentation of information about biometric data of the first type when the user is performing a different physical activity. In other words, there can be different thresholds used when different activities are performed. In some embodiments, the physiological-based threshold includes one or more of a hydration threshold, velocity/pace threshold, an oxygen level threshold, one or more heart-rate zone thresholds, a stress threshold, one or more cardiovascular zone thresholds, a posture threshold, etc. In some embodiments, the physiological-based threshold is a consolidated threshold that is based on two or more of a heart-rate, an oxygen saturation, a breathing rate, a body temperature, position data, orientation data, and/or other sensed data described below in reference to FIG. 7. The physiological-based thresholds can be user-defined or learned physiological-based thresholds based on the user's past performance of certain physical activities. The physiological-based thresholds can be stored on any (or all) of the wrist-wearable device, head-worn wearable device, and an intermediary device that facilitates communications between the wrist-wearable and head-worn wearable devices, as well as other devices described below in reference to FIGS. 5A-7.

The determination that the biometric data (and/or other sensed data) satisfies a physiological-based threshold can be based on sensed data provided to the head-worn wearable device via a communicatively coupled electronic device. For example, the wrist-wearable device 188 can monitor biometric data and provide the biometric data to the head-worn wearable device 110 to determine whether a physiological-based threshold is satisfied. Alternatively, in some embodiments, an electronic device communicatively coupled with the head-worn wearable device 110 provides instructions to the head-worn wearable device 110 that cause the LED of the head-worn wearable device 110 to illuminate with different patterns, frequencies, and/or colors based on a determination that a physiological-based threshold is satisfied. In some embodiments, the head-worn wearable device 110 can monitor biometric data sensed by a biometric sensor of the head-worn wearable device 110 and/or position data sensed by one or more sensors of the head-worn wearable device 110 to determine whether a physiological-based threshold is satisfied. In some embodiments, biometric data (and/or other data) received from one or more communicatively coupled devices is analyzed and consolidated to determine whether physiological-based threshold is satisfied. For example, biometric data provided to the head-worn wearable device 110 from the wrist-wearable device 188 can be consolidated with sensed biometric data at the head-worn wearable device 110 to determine whether the physiological-based threshold is satisfied. Additional data that can be received and/or monitored by the head-worn wearable device 110 and/or other devices communicatively coupled with the head-worn wearable device 110 is described in reference to FIGS. 1A-7. The illumination of the LED is described below.

In some embodiments, the method 400 includes while the user is performing (440) the physical activity receiving (450) position data sensed by one or more sensors of the wrist-wearable device 188 that are distinct from the biometric sensor used to sense the biometric data, and, in accordance with a determination that the position data indicates that the user requires guidance in performing the physical activity, causing (460) the head-worn wearable device to present, via the at least one LED of the head-worn wearable device, guidance to assist the user in performing the physical activity. In addition, in some embodiments, the method 400 includes, in accordance with a determination that the position data sensed by the one or more sensors of the head-worn wearable device indicates that the user requires guidance in performing the physical activity, the method 400 include causing the head-worn wearable device 110 to present, via the at least one LED of the head-worn wearable device, guidance to assist the user in performing the physical activity. The determination that the position data indicates that the user requires guidance is made when it is determined that the position data indicates that the user is incorrectly performing the physical activity. For example, as shown in FIGS. 2A-2D, the head-worn wearable device 110 is caused to illuminate a LED 127 to provide a user 130 with guidance on how to correct their posture.

In some embodiments, the guidance to assist the user in performing the physical activity is caused to be presented in conjunction with audible feedback, presented via a speaker of the head-worn wearable device, that also assists the user in performing the physical activity. Alternatively, in some embodiments, the guidance to assist the user in performing the physical activity is caused to be presented using only audible feedback (e.g., without illumination of the LED). In some embodiments, only audio feedback (e.g., instructions voiced over a speaker of the head-worn wearable device 110) is preferred for providing guidance (e.g., positioning guidance, such as correcting posture) illumination of the LED 127 may be harder to interpret for guidance. In some embodiments, audio feedback can be provided to the user via one or more communicatively coupled speakers worn by the user 130 (e.g., headphones). In some embodiments, audio feedback is only available when the head-worn wearable device 110 is communicatively coupled with speakers worn by the user 130 (e.g., in situations where the user 130 desires more privacy and does not want the guidance to be announced to others in proximity). Examples of the different information provided to the user via illumination of a LED 127 are provided above in reference to FIGS. 1A-2D.

In some embodiments, the head-worn wearable device 110 includes a single LED configured to illuminate with any color, at different frequencies (e.g., steady light, strobe, predetermined intervals, etc.), and with different patterns (e.g., at least two flashes, at least three flashes, morse code, etc.). In some embodiments, different colors, patterns, and/or frequencies of the LED are associated with respective physiological-based thresholds and/or sensed data. For example, the LED can be configured to illuminate red to inform the user 130 that they should pay attention to their posture, illuminate green to inform the user that they are at their target heart rate, etc.

Alternatively, in some embodiments, the head-worn wearable device 110 can include a plurality of LEDs. The information about the biometric data (or other sensed data) can be provided using more than one LED. In some embodiments, different LEDs are associated with respective physiological-based thresholds and/or sensed data. For example, a plurality of LEDs can include a first LED associated with a user 130's heart rate (e.g., a HR LED), a second LED associated with a user 130's oxygen saturation (e.g., a SPO2 LED), a third LED associated with a user 130's breathing rate (e.g., a breathing rate LED), a fourth LED associated with a user 130's posture (e.g., a posture LED), etc. Each LED can be configured to illuminate with any color, at different frequencies, and with different patterns. In some embodiments, each LED is individually controlled based on the information about the sensor data (e.g., causing respective LEDs to illuminate red, yellow, or green to inform the user 130 that adjustments are needed, caution is needed, or no major issues detected, respectively). Alternatively, in some embodiments, each LED is configured to illuminate with a respective color, pattern, frequency based on the information about the sensor data (e.g., a posture LED can be caused to illuminate red to inform the user 130 to pay attention to their posture, a breathing rate LED can be caused to illuminate purple to inform the user 130 to pay attention to their breathing, etc.).

In some embodiments, the wrist-wearable device 188 (or other communicatively coupled electronic device) is configured to monitor additional biometric data for the user 130 during the physical activity, which is sensed using an additional biometric sensor that is distinct from the biometric sensor used to provide the biometric data referenced in operation 430. The method 400 further includes, while the user is performing the physical activity, in accordance with a determination that additional biometric data satisfies an additional physiological-based threshold, distinct from the physiological-based threshold, indicating that information about the additional biometric data would assist the user in performing the physical activity, causing the head-worn wearable device to present, via an additional LED of the plurality of LEDs, the information about the additional biometric data. In some embodiments, the information about the additional biometric data and the information about the biometric data are caused to be presented via the additional LED and the at least one LED, respectively, during an overlapping period of time. In some embodiments, the wrist-wearable device is configured to monitor further biometric data for the user during the physical activity, the further biometric data being sensed using one other biometric sensor that is distinct from the biometric sensor and the additional biometric sensor. The method 400 further includes, while the user is performing the physical activity, in accordance with a determination that further biometric data satisfies a further physiological-based threshold, distinct from the physiological-based threshold and the additional physiological-based threshold, indicating that information about the further biometric data would assist the user in performing the physical activity, causing the head-worn wearable device to present, via a further LED of the plurality of LEDs, the information about the further biometric data. The information about the additional biometric data, the information about the biometric data, and the information about the further biometric data are caused to be presented via the additional LED, the at least one LED, and the further LED, respectively, during an overlapping period of time. In other words, as described above, different LEDs can be controlled individually to communicate different information to the user 130.

In some embodiments, the LED is coupled with a housing of the head-worn wearable device 110. Alternatively or in addition, in some embodiments, the LED is coupled with one or more lenses of the head-worn wearable device 110. The head-worn wearable device 110 is configured to provide information about the sensor data without the use of a head-up display, screen display, overhead display, etc. In some embodiments, the head-worn wearable device 110 does not include a head-up display, screen display, overhead display, etc.

In some embodiments, the information about the sensor data and/or the guidance to assist the user is variable light-based representations communicate to the user 130 how to improve their posture and/or technique. For example, the variable light-based representations can help the user in perform Yoga, High-Intensity Interval Training (HIIT) routines, golf, jogging, and a number of other physical activities. In some embodiments, the variable light-based representation can be presented only to the user (without obstructing their view), to the user and others (e.g., to a workout instructor such that the workout instructor can coach or instruct the user), and/or only to others (e.g., a do not disturb indicator).

Example Wrist-Wearable Devices

Figure 5A:
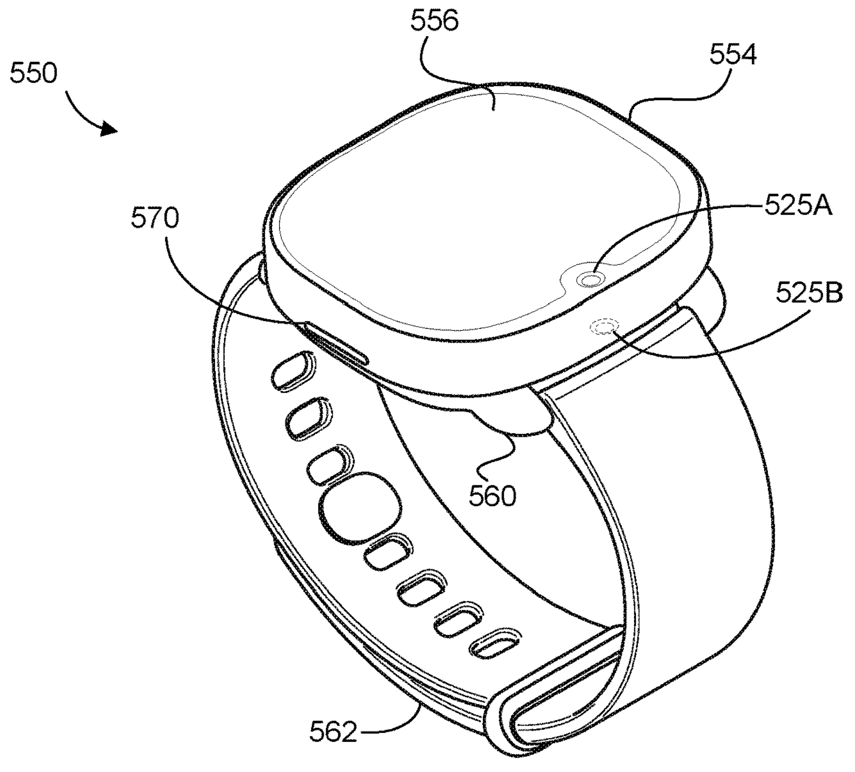
FIGS. 5A-5E illustrate an example wrist-wearable device, in accordance with some embodiments.
Figure 5A:
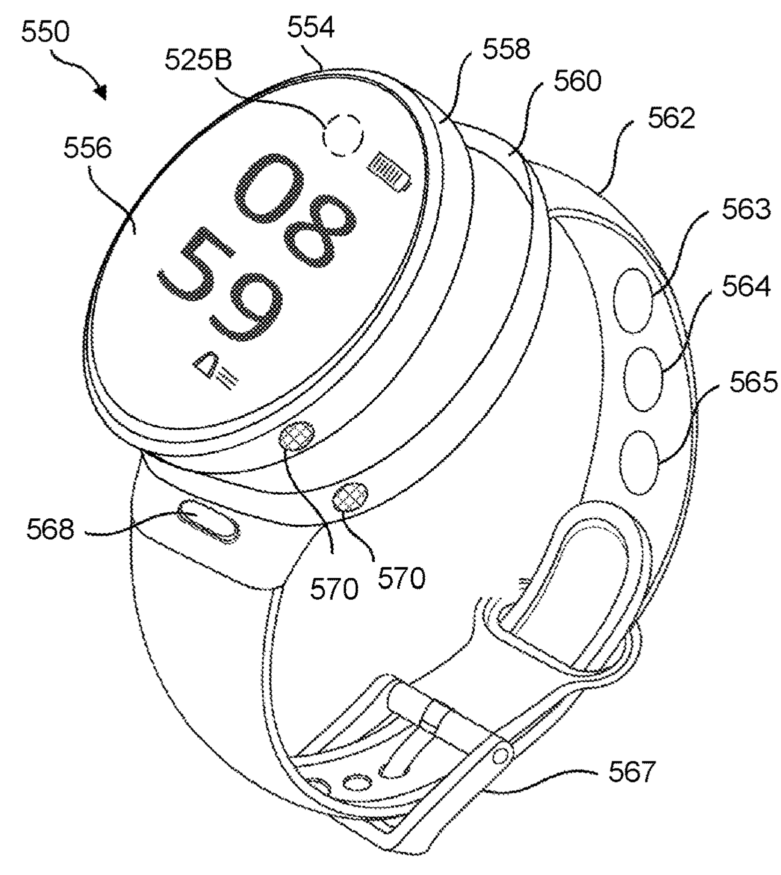
Figure 5B:
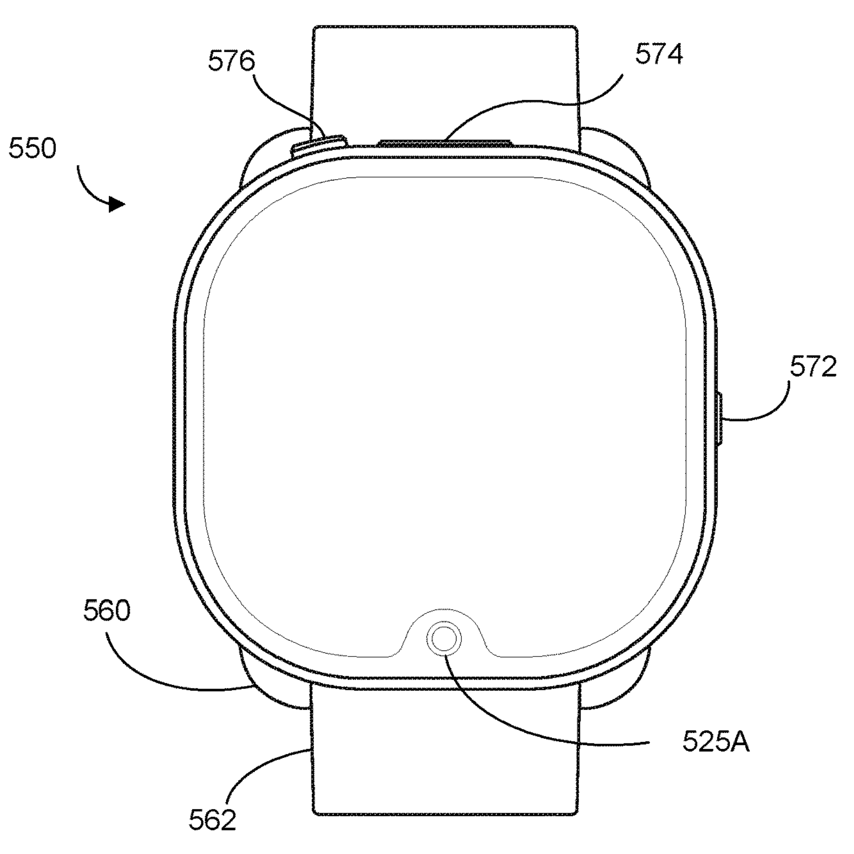
Figure 5B:
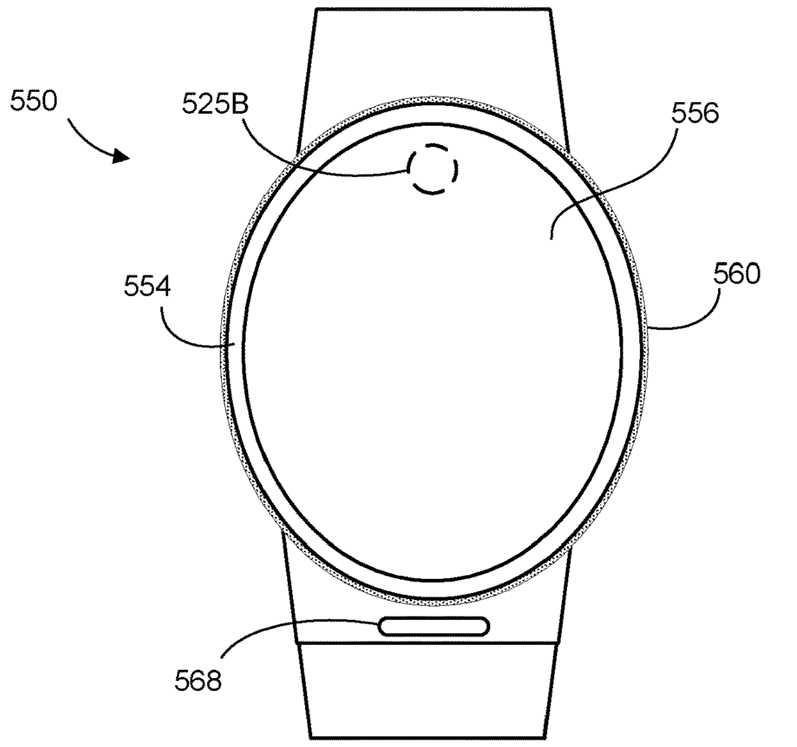

FIGS. 5A and 5B illustrate an example wrist-wearable device 550, in accordance with some embodiments. The wrist-wearable device 550 is an instance of the wearable device described herein, such that the wearable device should be understood to have the features of the wrist-wearable device 550 and vice versa. FIG. 5A illustrates a perspective view of the wrist-wearable device 550 that includes a watch body 554 coupled with a watch band 562. The watch body 554 and the watch band 562 can have a substantially rectangular or circular shape and can be configured to allow a user to wear the wrist-wearable device 550 on a body part (e.g., a wrist). The wrist-wearable device 550 can include a retaining mechanism 567 (e.g., a buckle, a hook and loop fastener, etc.) for securing the watch band 562 to the user's wrist. The wrist-wearable device 550 can also include a coupling mechanism 560 (e.g., a cradle) for detachably coupling the capsule or watch body 554 (via a coupling surface of the watch body 554) to the watch band 562.

The wrist-wearable device 550 can perform various functions associated with navigating through user interfaces and selectively opening applications, as well as the different operations described above in reference to FIGS. 1A-4. As will be described in more detail below, operations executed by the wrist-wearable device 550 can include, without limitation, display of visual content to the user (e.g., visual content displayed on display 556); sensing user input (e.g., sensing a touch on peripheral button 568, sensing biometric data on sensor 564, sensing neuromuscular signals on neuromuscular sensor 565, etc.); messaging (e.g., text, speech, video, etc.); image capture; wireless communications (e.g., cellular, near field, Wi-Fi, personal area network, etc.); location determination; financial transactions; providing haptic feedback; alarms; notifications; biometric authentication; health monitoring; sleep monitoring; etc. These functions can be executed independently in the watch body 554, independently in the watch band 562, and/or in communication between the watch body 554 and the watch band 562. In some embodiments, functions can be executed on the wrist-wearable device 550 in conjunction with an artificial-reality environment that includes, but is not limited to, virtual-reality (VR) environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments. As the skilled artisan will appreciate upon reading the descriptions provided herein, the novel wearable devices described herein can be used with any of these types of artificial-reality environments.

The watch band 562 can be configured to be worn by a user such that an inner surface of the watch band 562 is in contact with the user's skin. When worn by a user, sensor 564 is in contact with the user's skin. The sensor 564 can be a biosensor that senses a user's heart rate, saturated oxygen level, temperature, sweat level, muscle intentions, or a combination thereof. The watch band 562 can include multiple sensors 564 that can be distributed on an inside and/or an outside surface of the watch band 562. Additionally, or alternatively, the watch body 554 can include sensors that are the same or different than those of the watch band 562 (or the watch band 562 can include no sensors at all in some embodiments). For example, multiple sensors can be distributed on an inside and/or an outside surface of the watch body 554. As described below with reference to FIGS. 5B and/or 5C, the watch body 554 can include, without limitation, a front-facing image sensor 525A and/or a rear-facing image sensor 525B, a biometric sensor, an IMU, a heart rate sensor, a saturated oxygen sensor, a neuromuscular sensor (s), an altimeter sensor, a temperature sensor, a bioimpedance sensor, a pedometer sensor, an optical sensor (e.g., imaging sensor 5104), a touch sensor, a sweat sensor, etc. The sensor 564 can also include a sensor that provides data about a user's environment including a user's motion (e.g., an IMU), altitude, location, orientation, gait, or a combination thereof. The sensor 564 can also include a light sensor (e.g., an infrared light sensor, a visible light sensor) that is configured to track a position and/or motion of the watch body 554 and/or the watch band 562. The watch band 562 can transmit the data acquired by sensor 564 to the watch body 554 using a wired communication method (e.g., a Universal Asynchronous Receiver/Transmitter (UART), a USB transceiver, etc.) and/or a wireless communication method (e.g., near field communication, Bluetooth, etc.). The watch band 562 can be configured to operate (e.g., to collect data using sensor 564) independent of whether the watch body 554 is coupled to or decoupled from watch band 562.

In some examples, the watch band 562 can include a neuromuscular sensor 565 (e.g., an EMG sensor, a mechanomyogram (MMG) sensor, a sonomyography (SMG) sensor, etc.). Neuromuscular sensor 565 can sense a user's intention to perform certain motor actions. The sensed muscle intention can be used to control certain user interfaces displayed on the display 556 of the wrist-wearable device 550 and/or can be transmitted to a device responsible for rendering an artificial-reality environment (e.g., a head-mounted display) to perform an action in an associated artificial-reality environment, such as to control the motion of a virtual device displayed to the user.

Signals from neuromuscular sensor 565 can be used to provide a user with an enhanced interaction with a physical object and/or a virtual object in an artificial-reality application generated by an artificial-reality system (e.g., user interface objects presented on the display 556, or another computing device (e.g., a smartphone)). Signals from neuromuscular sensor 565 can be obtained (e.g., sensed and recorded) by one or more neuromuscular sensors 565 of the watch band 562. Although FIG. 5A shows one neuromuscular sensor 565, the watch band 562 can include a plurality of neuromuscular sensors 565 arranged circumferentially on an inside surface of the watch band 562 such that the plurality of neuromuscular sensors 565 contact the skin of the user. The watch band 562 can include a plurality of neuromuscular sensors 565 arranged circumferentially on an inside surface of the watch band 562. Neuromuscular sensor 565 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 562 and/or watch body 554 can include a haptic device 563 (e.g., a vibratory haptic actuator) that is configured to provide haptic feedback (e.g., a cutaneous and/or kinesthetic sensation, etc.) to the user's skin. The sensors 564 and 565, and/or the haptic device 563 can be configured to operate in conjunction with multiple applications including, without limitation, health monitoring, social media, game playing, and artificial reality (e.g., the applications associated with artificial reality).

The wrist-wearable device 550 can include a coupling mechanism (also referred to as a cradle) for detachably coupling the watch body 554 to the watch band 562. A user can detach the watch body 554 from the watch band 562 in order to reduce the encumbrance of the wrist-wearable device 550 to the user. The wrist-wearable device 550 can include a coupling surface on the watch body 554 and/or coupling mechanism(s) 560 (e.g., a cradle, a tracker band, a support base, a clasp). A user can perform any type of motion to couple the watch body 554 to the watch band 562 and to decouple the watch body 554 from the watch band 562. For example, a user can twist, slide, turn, push, pull, or rotate the watch body 554 relative to the watch band 562, or a combination thereof, to attach the watch body 554 to the watch band 562 and to detach the watch body 554 from the watch band 562.

As shown in the example of FIG. 5A, the watch band coupling mechanism 560 can include a type of frame or shell that allows the watch body 554 coupling surface to be retained within the watch band coupling mechanism 560. The watch body 554 can be detachably coupled to the watch band 562 through a friction fit, magnetic coupling, a rotation-based connector, a shear-pin coupler, a retention spring, one or more magnets, a clip, a pin shaft, a hook and loop fastener, or a combination thereof. In some examples, the watch body 554 can be decoupled from the watch band 562 by actuation of the release mechanism 570. The release mechanism 570 can include, without limitation, a button, a knob, a plunger, a handle, a lever, a fastener, a clasp, a dial, a latch, or a combination thereof.

As shown in FIGS. 5A-5B, the coupling mechanism 560 can be configured to receive a coupling surface proximate to the bottom side of the watch body 554 (e.g., a side opposite to a front side of the watch body 554 where the display 556 is located), such that a user can push the watch body 554 downward into the coupling mechanism 560 to attach the watch body 554 to the coupling mechanism 560. In some embodiments, the coupling mechanism 560 can be configured to receive a top side of the watch body 554 (e.g., a side proximate to the front side of the watch body 554 where the display 556 is located) that is pushed upward into the cradle, as opposed to being pushed downward into the coupling mechanism 560. In some embodiments, the coupling mechanism 560 is an integrated component of the watch band 562 such that the watch band 562 and the coupling mechanism 560 are a single unitary structure.

The wrist-wearable device 550 can include a single release mechanism 570 or multiple release mechanisms 570 (e.g., two release mechanisms 570 positioned on opposing sides of the wrist-wearable device 550 such as spring-loaded buttons). As shown in FIG. 5A, the release mechanism 570 can be positioned on the watch body 554 and/or the watch band coupling mechanism 560. Although FIG. 5A shows release mechanism 570 positioned at a corner of watch body 554 and at a corner of watch band coupling mechanism 560, the release mechanism 570 can be positioned anywhere on watch body 554 and/or watch band coupling mechanism 560 that is convenient for a user of wrist-wearable device 550 to actuate. A user of the wrist-wearable device 550 can actuate the release mechanism 570 by pushing, turning, lifting, depressing, shifting, or performing other actions on the release mechanism 570. Actuation of the release mechanism 570 can release (e.g., decouple) the watch body 554 from the watch band coupling mechanism 560 and the watch band 562 allowing the user to use the watch body 554 independently from watch band 562. For example, decoupling the watch body 554 from the watch band 562 can allow the user to capture images using rear-facing image sensor 525B.

FIG. 5B includes top views of examples of the wrist-wearable device 550. The examples of the wrist-wearable device 550 shown in FIGS. 5A-5B can include a coupling mechanism 560 (as shown in FIG. 5B, the shape of the coupling mechanism can correspond to the shape of the watch body 554 of the wrist-wearable device 550). The watch body 554 can be detachably coupled to the coupling mechanism 560 through a friction fit, magnetic coupling, a rotation-based connector, a shear-pin coupler, a retention spring, one or more magnets, a clip, a pin shaft, a hook and loop fastener, or any combination thereof.

In some examples, the watch body 554 can be decoupled from the coupling mechanism 560 by actuation of a release mechanism 570. The release mechanism 570 can include, without limitation, a button, a knob, a plunger, a handle, a lever, a fastener, a clasp, a dial, a latch, or a combination thereof. In some examples, the wristband system functions can be executed independently in the watch body 554, independently in the coupling mechanism 560, and/or in communication between the watch body 554 and the coupling mechanism 560. The coupling mechanism 560 can be configured to operate independently (e.g., execute functions independently) from watch body 554. Additionally, or alternatively, the watch body 554 can be configured to operate independently (e.g., execute functions independently) from the coupling mechanism 560. As described below with reference to the block diagram of FIG. 5A, the coupling mechanism 560 and/or the watch body 554 can each include the independent resources required to independently execute functions. For example, the coupling mechanism 560 and/or the watch body 554 can each include a power source (e.g., a battery), a memory, data storage, a processor (e.g., a central processing unit (CPU)), communications, a light source, and/or input/output devices.

The wrist-wearable device 550 can have various peripheral buttons 572, 574, and 576, for performing various operations at the wrist-wearable device 550. Also, various sensors, including one or both of the sensors 564 and 565, can be located on the bottom of the watch body 554, and can optionally be used even when the watch body 554 is detached from the watch band 562.

Figure 5C:
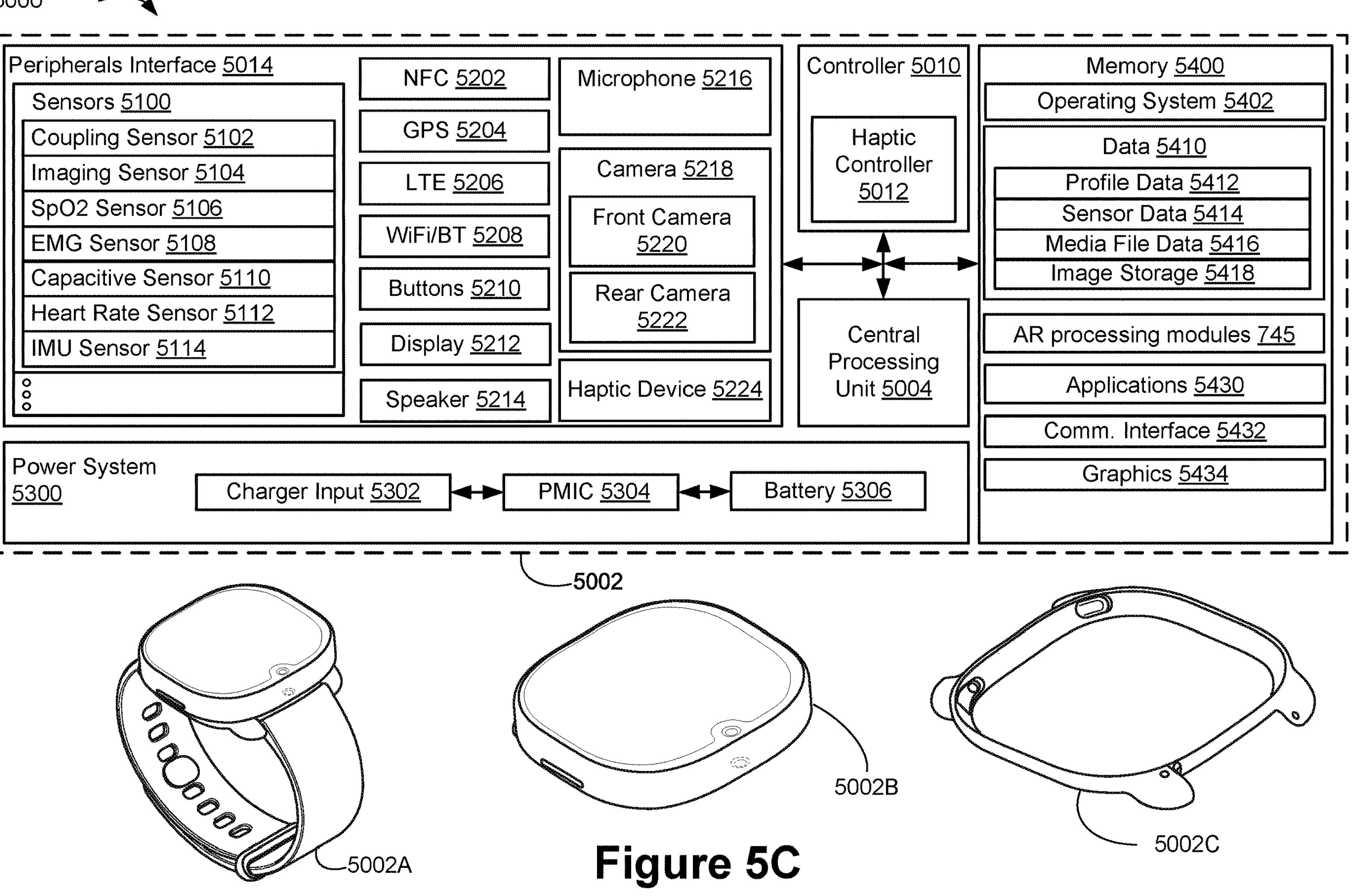

FIG. 5C is a block diagram of a computing system 5000, according to at least one embodiment of the present disclosure. The computing system 5000 includes an electronic device 5002, which can be, for example, a wrist-wearable device. The wrist-wearable device 550 described in detail above with respect to FIGS. 5A-5B is an example of the electronic device 5002, so the electronic device 5002 will be understood to include the components shown and described below for the computing system 5000. In some embodiments, all, or a substantial portion of the components of the computing system 5000 are included in a single integrated circuit. In some embodiments, the computing system 5000 can have a split architecture (e.g., a split mechanical architecture, a split electrical architecture) between a watch body (e.g., a watch body 554 in FIGS. 5A-5B) and a watch band (e.g., a watch band 562 in FIGS. 5A-5B). The electronic device 5002 can include a processor (e.g., a central processing unit 5004), a controller 5010, a peripherals interface 5014 that includes one or more sensors 5100 and various peripheral devices, a power source (e.g., a power system 5300), and memory (e.g., a memory 5400) that includes an operating system (e.g., an operating system 5402), data (e.g., data 5410), and one or more applications (e.g., applications 5430).

In some embodiments, the computing system 5000 includes the power system 5300 which includes a charger input 5302, a power-management integrated circuit (PMIC) 5304, and a battery 5306.

In some embodiments, a watch body and a watch band can each be electronic devices 5002 that each have respective batteries (e.g., battery 5306), and can share power with each other. The watch body and the watch band can receive a charge using a variety of techniques. In some embodiments, the watch body and the watch band can use a wired charging assembly (e.g., power cords) to receive the charge. Alternatively, or in addition, the watch body and/or the watch band can be configured for wireless charging. For example, a portable charging device can be designed to mate with a portion of watch body and/or watch band and wirelessly deliver usable power to a battery of watch body and/or watch band.

The watch body and the watch band can have independent power systems 5300 to enable each to operate independently. The watch body and watch band can also share power (e.g., one can charge the other) via respective PMICs 5304 that can share power over power and ground conductors and/or over wireless charging antennas.

In some embodiments, the peripherals interface 5014 can include one or more sensors 5100. The sensors 5100 can include a coupling sensor 5102 for detecting when the electronic device 5002 is coupled with another electronic device 5002 (e.g., a watch body can detect when it is coupled to a watch band, and vice versa). The sensors 5100 can include imaging sensors 5104 for collecting imaging data, which can optionally be the same device as one or more of the cameras 5218. In some embodiments, the imaging sensors 5104 can be separate from the cameras 5218. In some embodiments the sensors include an SpO2 sensor 5106. In some embodiments, the sensors 5100 include an EMG sensor 5108 for detecting, for example muscular movements by a user of the electronic device 5002. In some embodiments, the sensors 5100 include a capacitive sensor 5110 for detecting changes in potential of a portion of a user's body. In some embodiments, the sensors 5100 include a heart rate sensor 5112. In some embodiments, the sensors 5100 include an inertial measurement unit (IMU) sensor 5114 for detecting, for example, changes in acceleration of the user's hand.

In some embodiments, the peripherals interface 5014 includes a near-field communication (NFC) component 5202, a global-position system (GPS) component 5204, a long-term evolution (LTE) component 5206, and or a Wi-Fi or Bluetooth communication component 5208.

In some embodiments, the peripherals interface includes one or more buttons (e.g., the peripheral buttons 576, 574, and 5572 in FIG. 5B), which, when selected by a user, cause operation to be performed at the electronic device 5002.

The electronic device 5002 can include at least one display 5212, for displaying visual affordances to the user, including user-interface elements and/or three-dimensional virtual objects. The display can also include a touch screen for inputting user inputs, such as touch gestures, swipe gestures, and the like.

The electronic device 5002 can include at least one speaker 5214 and at least one microphone 5216 for providing audio signals to the user and receiving audio input from the user. The user can provide user inputs through the microphone 5216 and can also receive audio output from the speaker 5214 as part of a haptic event provided by the haptic controller 5012.

The electronic device 5002 can include at least one camera 5218, including a front camera 5220 and a rear camera 5222. In some embodiments, the electronic device 5002 can be a head-wearable device, and one of the cameras 5218 can be integrated with a lens assembly of the head-wearable device.

One or more of the electronic devices 5002 can include one or more haptic controllers 5012 and associated componentry for providing haptic events at one or more of the electronic devices 5002 (e.g., a vibrating sensation or audio output in response to an event at the electronic device 5002). The haptic controllers 5012 can communicate with one or more electroacoustic devices, including a speaker of the one or more speakers 5214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 5012 can provide haptic events to that are capable of being sensed by a user of the electronic devices 5002. In some embodiments, the one or more haptic controllers 5012 can receive input signals from an application of the applications 5430.

Memory 5400 optionally includes high-speed random-access memory and optionally also includes non-volatile memory, such as one or more magnetic disk storage devices, flash memory devices, or other non-volatile solid-state memory devices. Access to the memory 5400 by other components of the electronic device 5002, such as the one or more processors of the central processing unit 5004, and the peripherals interface 5014 is optionally controlled by a memory controller of the controllers 5010.

In some embodiments, software components stored in the memory 5400 can include one or more operating systems 5402 (e.g., a Linux-based operating system, an Android operating system, etc.). The memory 5400 can also include data 5410, including structured data (e.g., SQL databases, MongoDB databases, GraphQL data, JSON data, etc.). The data 5410 can include profile data 5412, sensor data 5414, media file data 5416, and image storage 5418.

In some embodiments, software components stored in the memory 5400 include one or more applications 5430 configured to be perform operations at the electronic devices 5002. In some embodiments, the memory 5400 includes one or more communication interface modules 5432, one or more graphics modules 5434, and AR processing modules 745 (described below in reference to FIG. 7). In some embodiments, a plurality of applications 5430 can work in conjunction with one another to perform various tasks at one or more of the electronic devices 5002.

It should be appreciated that the electronic devices 5002 are only some examples of the electronic devices 5002 within the computing system 5000, and that other electronic devices 5002 that are part of the computing system 5000 can have more or fewer components than shown optionally combines two or more components, or optionally have a different configuration or arrangement of the components. The various components shown in FIG. 5C are implemented in hardware, software, firmware, or a combination thereof, including one or more signal processing and/or application-specific integrated circuits.

As illustrated by the lower portion of FIG. 5C, various individual components of a wrist-wearable device can be examples of the electronic device 5002. For example, some or all of the components shown in the electronic device 5002 can be housed or otherwise disposed in a combined watch device 5002A, or within individual components of the capsule device watch body 5002B, the cradle portion 5002C, and/or a watch band.

Figure 5D:
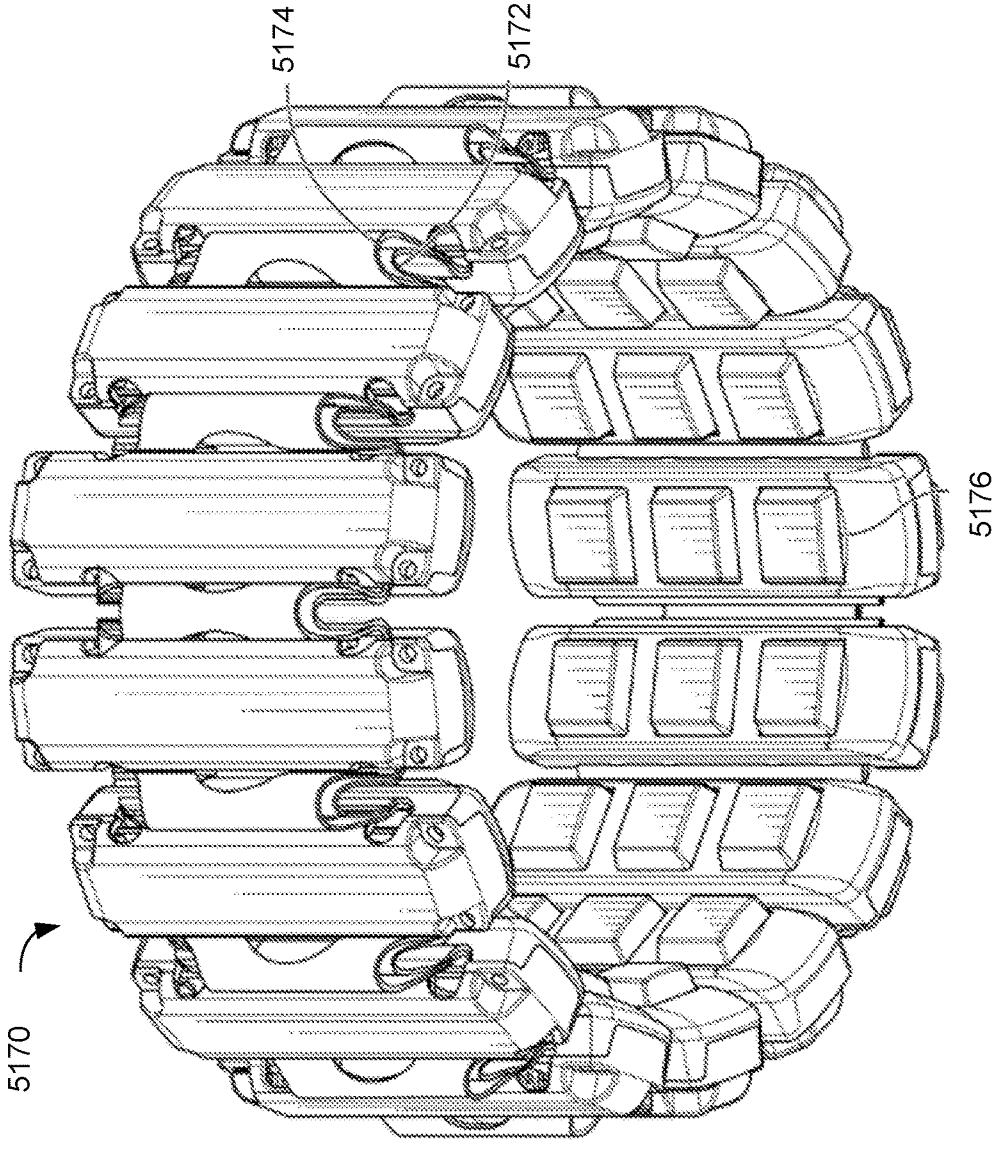

FIG. 5D illustrates a wearable device 5170, in accordance with some embodiments. In some embodiments, the wearable device 5170 is used to generate control information (e.g., sensed data about neuromuscular signals or instructions to perform certain commands after the data is sensed) for causing a computing device to perform one or more input commands. In some embodiments, the wearable device 5170 includes a plurality of neuromuscular sensors 5176. In some embodiments, the plurality of neuromuscular sensors 5176 includes a predetermined number of (e.g., 16) neuromuscular sensors (e.g., EMG sensors) arranged circumferentially around an elastic band 5174. The plurality of neuromuscular sensors 5176 may include any suitable number of neuromuscular sensors. In some embodiments, the number and arrangement of neuromuscular sensors 5176 depends on the particular application for which the wearable device 5170 is used. For instance, a wearable device 5170 configured as an armband, wristband, or chest-band may include a plurality of neuromuscular sensors 5176 with different number of neuromuscular sensors and different arrangement for each use case, such as medical use cases as compared to gaming or general day-to-day use cases. For example, at least 16 neuromuscular sensors 5176 may be arranged circumferentially around elastic band 5174.

In some embodiments, the elastic band 5174 is configured to be worn around a user's lower arm or wrist. The elastic band 5174 may include a flexible electronic connector 5172. In some embodiments, the flexible electronic connector 5172 interconnects separate sensors and electronic circuitry that are enclosed in one or more sensor housings. Alternatively, in some embodiments, the flexible electronic connector 5172 interconnects separate sensors and electronic circuitry that are outside of the one or more sensor housings. Each neuromuscular sensor of the plurality of neuromuscular sensors 5176 can include a skin-contacting surface that includes one or more electrodes. One or more sensors of the plurality of neuromuscular sensors 5176 can be coupled together using flexible electronics incorporated into the wearable device 5170. In some embodiments, one or more sensors of the plurality of neuromuscular sensors 5176 can be integrated into a woven fabric, wherein the fabric one or more sensors of the plurality of neuromuscular sensors 5176 are sewn into the fabric and mimic the pliability of fabric (e.g., the one or more sensors of the plurality of neuromuscular sensors 5176 can be constructed from a series woven strands of fabric). In some embodiments, the sensors are flush with the surface of the textile and are indistinguishable from the textile when worn by the user.

Figure 5E:
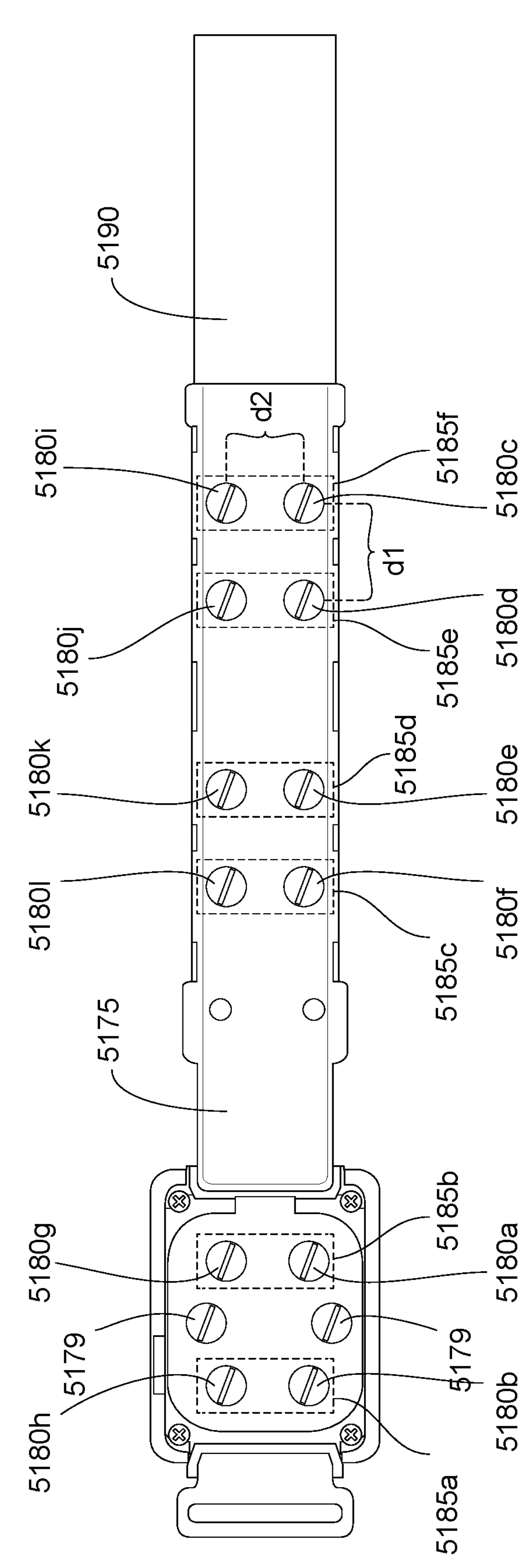
Figure 5E:

FIG. 5E illustrates a wearable device 5179 in accordance with some embodiments. The wearable device 5179 includes paired sensor channels 5185*a*-5185*f* along an interior surface of a wearable structure 5175 that are configured to detect neuromuscular signals. Different number of paired sensors channels can be used (e.g., one pair of sensors, three pairs of sensors, four pairs of sensors, or six pairs of sensors). The wearable structure 5175 can include a band portion 5190, a capsule portion 5195, and a cradle portion (not pictured) that is coupled with the band portion 5190 to allow for the capsule portion 5195 to be removably coupled with the band portion 5190. For embodiments in which the capsule portion 5195 is removable, the capsule portion 5195 can be referred to as a removable structure, such that in these embodiments the wearable device includes a wearable portion (e.g., band portion 5190 and the cradle portion) and a removable structure (the removable capsule portion which can be removed from the cradle). In some embodiments, the capsule portion 5195 includes the one or more processors and/or other components of the wearable device 188 described above in reference to FIG. 7. The wearable structure 5175 is configured to be worn by a user 130. More specifically, the wearable structure 5175 is configured to couple the wearable device 5179 to a wrist, arm, forearm, or other portion of the user's body. Each paired sensor channels 5185*a*-5185*f* includes two electrodes 5180 (e.g., electrodes 5180*a*-5180*h*) for sensing neuromuscular signals based on differential sensing within each respective sensor channel. In accordance with some embodiments, the wearable device 5170 further includes an electrical ground and a shielding electrode.

The techniques described above can be used with any device for sensing neuromuscular signals, including the arm-wearable devices of FIG. 5A-5C, but could also be used with other types of wearable devices for sensing neuromuscular signals (such as body-wearable or head-wearable devices that might have neuromuscular sensors closer to the brain or spinal column).

In some embodiments, a wrist-wearable device can be used in conjunction with a head-wearable device described below, and the wrist-wearable device can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses and VR headsets.

Example Head-Wearable Devices

Figure 6A:
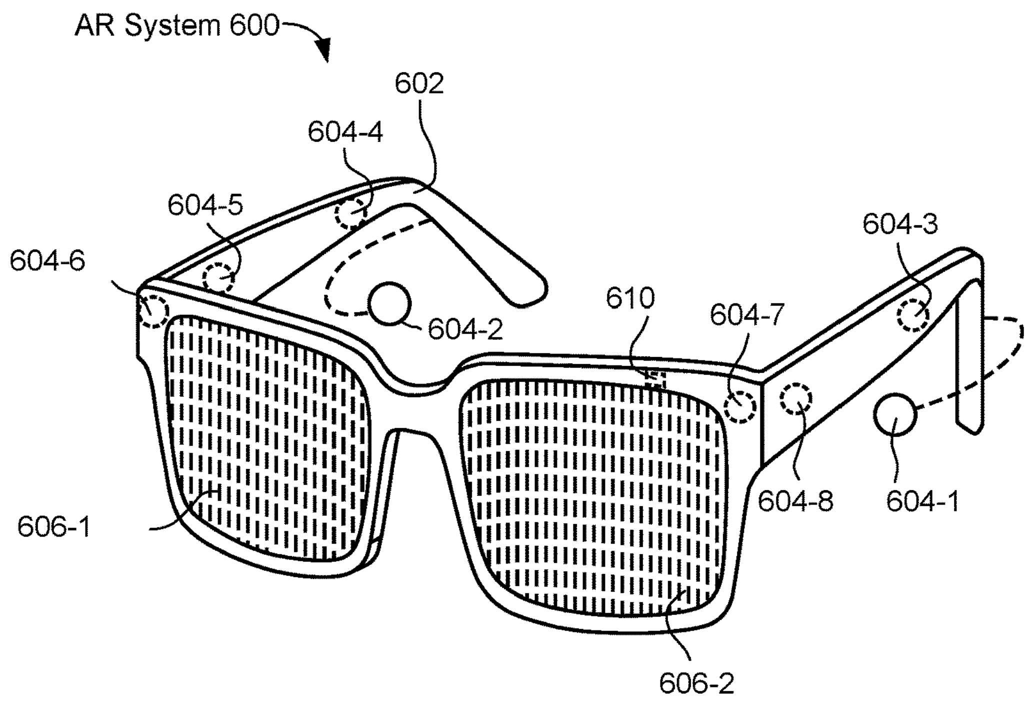
FIGS. 6A-6B illustrate an example AR system in accordance with some embodiments.

FIG. 6A shows an example AR system 600 in accordance with some embodiments. In FIG. 6A, the AR system 600 includes an eyewear device with a frame 602 configured to hold a left display device 606-1 and a right display device 606-2 in front of a user's eyes. The display devices 606-1 and 606-2 may act together or independently to present an image or series of images to a user. While the AR system 600 includes two displays, embodiments of this disclosure may be implemented in AR systems with a single near-eye display (NED) or more than two NEDs.

In some embodiments, the AR system 600 includes one or more sensors, such as the acoustic sensors 604. For example, the acoustic sensors 604 can generate measurement signals in response to motion of the AR system 600 and may be located on substantially any portion of the frame 602. Any one of the sensors may be a position sensor, an IMU, a depth camera assembly, or any combination thereof. In some embodiments, the AR system 600 includes more or fewer sensors than are shown in FIG. 6A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 600 includes a microphone array with a plurality of acoustic sensors 604-1 through 604-8, referred to collectively as the acoustic sensors 604. The acoustic sensors 604 may be transducers that detect air pressure variations induced by sound waves. In some embodiments, each acoustic sensor 604 is configured to detect sound and convert the detected sound into an electronic format (e.g., an analog or digital format). In some embodiments, the microphone array includes ten acoustic sensors: 604-1 and 604-2 designed to be placed inside a corresponding ear of the user, acoustic sensors 604-3, 604-4, 604-5, 604-6, 604-7, and 604-8 positioned at various locations on the frame 602, and acoustic sensors positioned on a corresponding neckband, where the neckband is an optional component of the system that is not present in certain embodiments of the artificial-reality systems discussed herein.

The configuration of the acoustic sensors 604 of the microphone array may vary. While the AR system 600 is shown in FIG. 6A having ten acoustic sensors 604, the number of acoustic sensors 604 may be more or fewer than ten. In some situations, using more acoustic sensors 604 increases the amount of audio information collected and/or the sensitivity and accuracy of the audio information. In contrast, in some situations, using a lower number of acoustic sensors 604 decreases the computing power required by a controller to process the collected audio information. In addition, the position of each acoustic sensor 604 of the microphone array may vary. For example, the position of an acoustic sensor 604 may include a defined position on the user, a defined coordinate on the frame 602, an orientation associated with each acoustic sensor, or some combination thereof.

The acoustic sensors 604-1 and 604-2 may be positioned on different parts of the user's ear. In some embodiments, there are additional acoustic sensors on or surrounding the ear in addition to acoustic sensors 604 inside the ear canal. In some situations, having an acoustic sensor positioned next to an ear canal of a user enables the microphone array to collect information on how sounds arrive at the ear canal. By positioning at least two of the acoustic sensors 604 on either side of a user's head (e.g., as binaural microphones), the AR device 600 is able to simulate binaural hearing and capture a 3D stereo sound field around a user's head. In some embodiments, the acoustic sensors 604-1 and 604-2 are connected to the AR system 600 via a wired connection, and in other embodiments, the acoustic sensors 604-1 and 604-2 are connected to the AR system 600 via a wireless connection (e.g., a Bluetooth connection). In some embodiments, the AR system 600 does not include the acoustic sensors 604-1 and 604-2.

The acoustic sensors 604 on the frame 602 may be positioned along the length of the temples, across the bridge of the nose, above or below the display devices 606, or in some combination thereof. The acoustic sensors 604 may be oriented such that the microphone array is able to detect sounds in a wide range of directions surrounding the user that is wearing the AR system 600. In some embodiments, a calibration process is performed during manufacturing of the AR system 600 to determine relative positioning of each acoustic sensor 604 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 600 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 600. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 600. For example, the controller may process information from the acoustic sensors 604. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 600 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 650 in FIG. 6B, which mostly or completely covers a user's field of view.

Figure 6B:
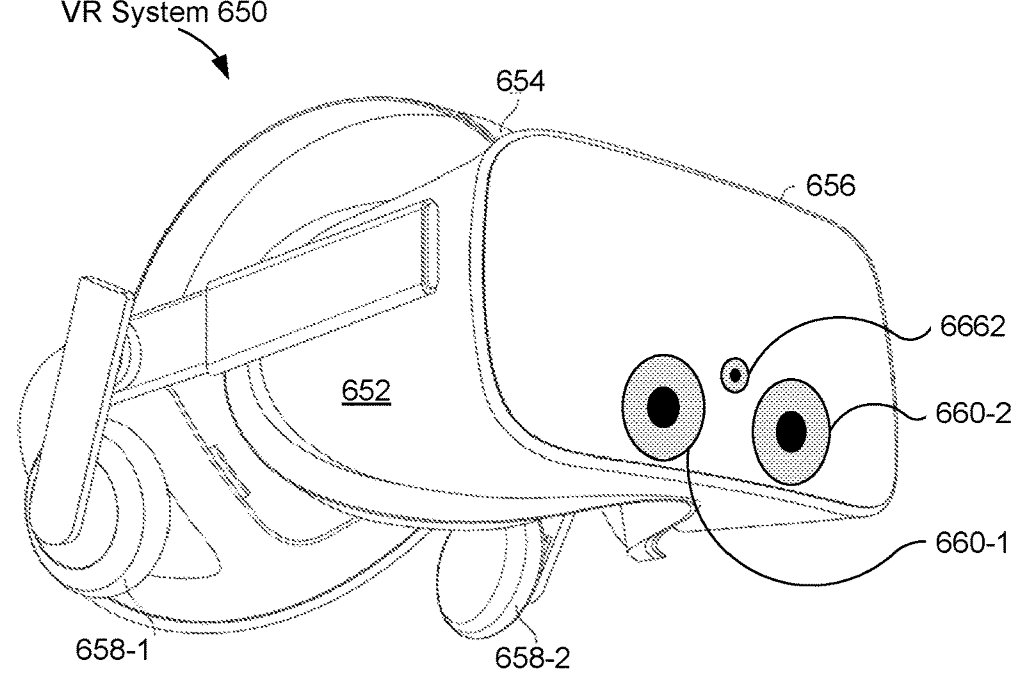

FIG. 6B shows a VR system 650 (e.g., also referred to herein as VR headsets or VR headset) in accordance with some embodiments. The VR system 650 includes a head-mounted display (HMD) 652. The HMD 652 includes a front body 656 and a frame 654 (e.g., a strap or band) shaped to fit around a user's head. In some embodiments, the HMD 652 includes output audio transducers 658-1 and 658-2, as shown in FIG. 6B (e.g., transducers). In some embodiments, the front body 656 and/or the frame 654 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 600 and/or the VR system 650 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 600 and/or the VR system 650 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 600 and/or the VR system 650 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 6B shows VR system 650 having cameras 660-1 and 660-2 that can be used to provide depth information for creating a voxel field and a two-dimensional mesh to provide object information to the user to avoid collisions. FIG. 6B also shows that the VR system includes one or more additional cameras 662 that are configured to augment the cameras 660-1 and 660-2 by providing more information. For example, the additional cameras 662 can be used to supply color information that is not discerned by cameras 660-1 and 660-2. In some embodiments, cameras 660-1 and 660-2 and additional cameras 662 can include an optional IR cut filter configured to remove IR light from being received at the respective camera sensors.

In some embodiments, the AR system 600 and/or the VR system 650 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIG. 6A-6B, but could also be used with other types of wearable devices for sensing neuromuscular signals (such as body-wearable or head-wearable devices that might have neuromuscular sensors closer to the brain or spinal column). Additionally, the AR system 600 and/or the VR system 650 can perform the various functions and operations described above in reference to FIGS. 1A-4. Having thus described example wrist-wearable device and head-wearable devices, attention will now be turned to example feedback systems that can be integrated into the devices described above or be a separate device.

Example System

Figure 7:
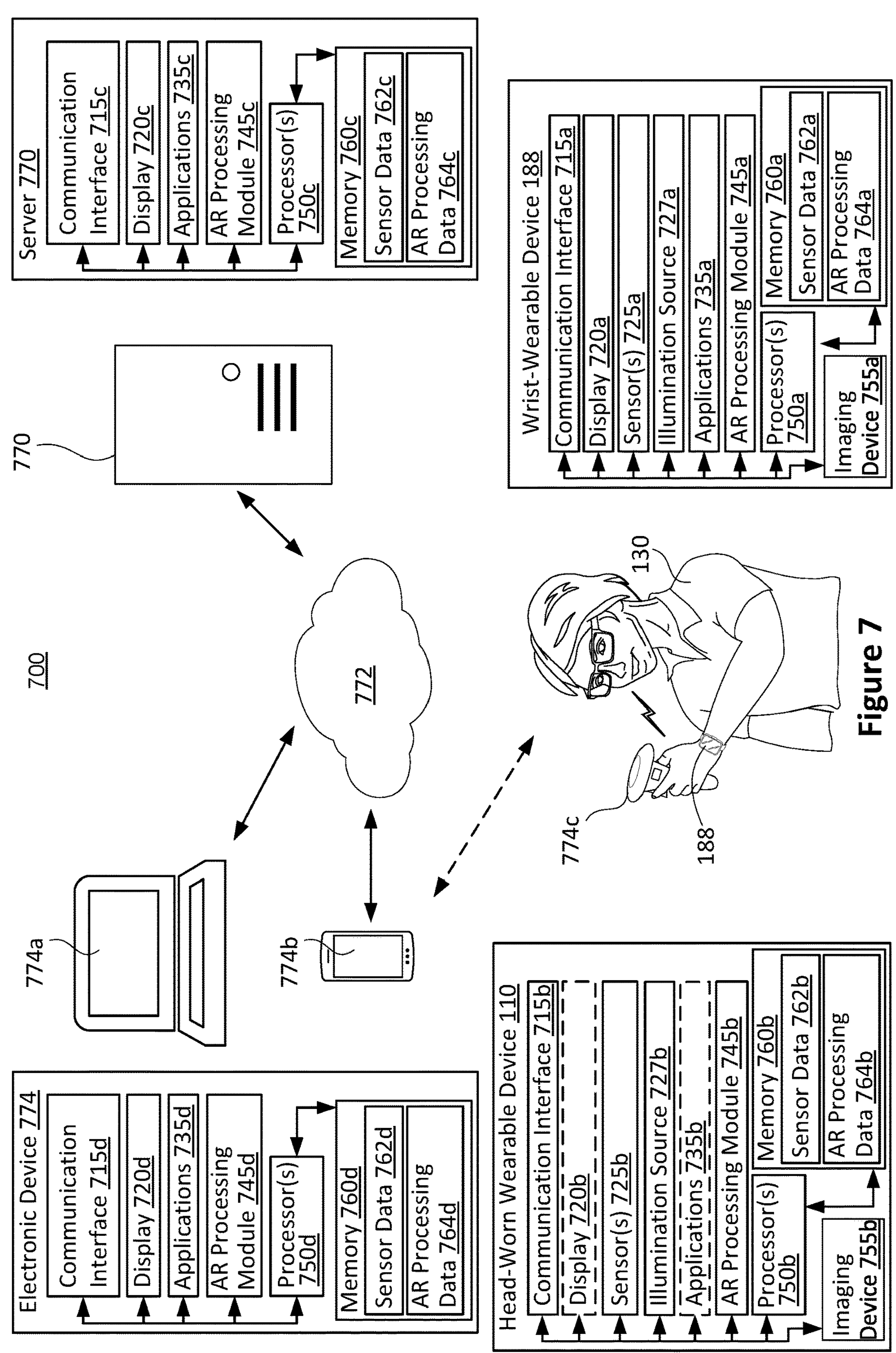
FIG. 7 illustrates a system of one or more devices for providing indications of biometric and other sensor data, in accordance with some embodiments.

FIG. 7 illustrates a system 700 of one or more devices for providing indications of biometric and other sensor data, in accordance with some embodiments. For example, a head-worn wearable device 110 can be configured to provide indications, via an illumination source, representative of an activity being performed by the user 130, based on received and/or monitored sensor data. The indications are used to communicate different messages to a user 130 and/or others in proximity (e.g., within at least 5-10 meters) of the user 130. The system 700 can include one or more of servers 770, electronic devices 774 (e.g., a computer, 774*a*, a smartphone 774*b*, a controller 774*c*, and/or other devices), head-worn wearable devices 110, and/or wrist-wearable devices 188. In some embodiments, the one or more of servers 770, electronic devices 774, head-worn wearable devices 110, and/or wrist-wearable devices 188 are communicatively coupled via a network 772. In some embodiments, the indications are provided via a head-worn wearable device 110 communicatively coupled with at least one other device, such as a wrist-wearable device 188, a smartphone 774*b*, a controller 774*c*, or other device. Indications can be provided by multiple devices in conjunction with the head-worn wearable device 110. For example, in some embodiments, the indications are also provided via a wrist-wearable device 188 communicatively coupled with at least one other device. In some embodiments, the indications are controlled via an artificial reality (AR) processing module 745. The AR processing module 745 can be implemented in one or more devices, such as the one or more of servers 770, electronic devices 774, head-worn wearable devices 110, and/or wrist-wearable devices 188. In some embodiments, the one or more devices perform operations of the AR processing module 745, using one or more respective processors, individually or in conjunction with at least one other device as described herein.

In some embodiments, the head-worn wearable device 110 includes one or more components such as a communication interface 715*b*, one or more sensors 725*b*, an illumination source 727, an AR processing module 745*b*, one or more imaging devices 755*b* (e.g., a camera), one or more processors 750*b*, and memory 760*b* (including sensor data 762*b* and AR processing data 764*b*). In addition, in some embodiments, the head-worn wearable device 110 includes a display 720*b* and one or more applications 735*b*. In some embodiments, the memory 760*b* is configured to store sensor data 762*b* and AR processing data 764*b*. Although not show, in some embodiments, the memory 760*b* can include application data, device data (e.g., device hardware, device model, etc.), image data, and/or user data (e.g., data collected through use of a device, data collected through use of an application, user preferences, or other information stored by the user). In some embodiments, the head-worn wearable device 110 includes smart glasses (e.g., the augmented-reality glasses), artificial reality headsets (e.g., VR/AR headsets), or other head worn device. In some embodiments, one or more components of the head-worn wearable device 110 are housed within a body of the head-worn wearable device 110 (e.g., frames of smart glasses, a body of a AR headset, etc.). In addition, in some embodiments, one or more components of the head-worn wearable device 110 are stored within or coupled with lenses of the head-worn wearable device 110.

In some embodiments, the communications interface 715 is configured to communicatively couple the head-worn wearable device 110 to one or more other devices such as the wrist-wearable device 188, electronic device 774 (e.g., a computer 774*a*, a smartphone 774*b*, a controller 774*c*, a tablet, etc.), and/or one or more servers 770. The communication interface 715 is used establish wired or wireless connections between the wrist-wearable device 188 and the other devices. In some embodiments, the communication interface 715 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

An optional display 720 is configured to present information to the user 130, such as one or more user interfaces, messages, notifications (e.g., alerts, alarms, etc.), images, and video. In some embodiments, the display 720 is an overhead display that displays information to a user without obstructing the user 130's view.

The one or more sensors 725 can include heart rate sensors, electromyography (EMG) sensors, SpO2 sensors, altimeters, thermal sensors or thermal couples, ambient light sensors, ambient noise sensors, and/or inertial measurement units (IMU)s. Additional non-limiting examples of the one or more sensors 725 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 725 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 725 can include location sensing devices (e.g., GPS) configured to provide location information. In some embodiment, the data measured or sensed by the one or more sensors 725 is stored in memory 760. In some embodiments, the sensor data is used by the head-worn wearable device 110 for communicating different messages, via indications generated by the illumination source 727, that would assist the user 130 in performing an activity as discussed below.

The illumination source 727 can include one or more LEDs 127 (FIGS. 1A-2D) or similar light sources. The illumination source 727 can be caused to illuminate in different patterns, illuminate in different colors, illuminate at different frequencies, etc. to communicate different messages to the user while the user is performing an activity (e.g., a workout). More specifically, the illumination source 727 can be caused to provide a variable light-based representation of an activity being performed by the user 130. The variable light-based representations can be based on sensor data, active applications, device data, and/or other data streams, as discussed herein. In some embodiments, one or more illumination sources 727 can be coupled with a housing of the head-worn wearable device 110 and/or within one or more lenses of the head-worn wearable device 110. One or more illumination sources 727 can be positioned at distinct locations of the head-worn wearable device 110 as shown and described above in reference to FIGS. 1A-1D. In some embodiments, the one or more illumination sources 727 are positioned such that only the user 130 can view the variable light-based representation, the user 130 and others in proximity to the user 130 (e.g., within at least 5-10 meters) can view the variable light-based representation, and/or only others in proximity to the user 130 can view the variable light-based representation. Each illumination source 727 can be controlled individually such that each illumination source 727 can provide the same variable light-based representation or a distinct variable light-based representation. The different messages communicated to the user based on the variable light-based representation are discussed below in reference to the AR processing module 745.

In some embodiments, the one or more applications 735 include social-media applications, banking applications, health applications, messaging applications, web browsers, gaming application, streaming applications, media applications, imaging applications, productivity applications, social applications, etc. In some embodiments, the one or more applications 735 include artificial reality applications. The one or more applications 735 can be configured to provide data to the head-worn wearable device 110 that can be used to determine variable light-based representations. In some embodiments, the one or more applications 735 can be displayed via an optional display of the head-worn wearable device 110.

In some embodiments, the AR processing module 745 is configured dynamically determine one or more indications that would assist the user 130 in performing an activity based at least on sensor data. For example, the head-worn wearable device 110 can receive biometric data from one or more biometric sensors of a wrist-wearable device 188 worn by the user 130 and communicatively coupled to the head-worn wearable device 110, and provide the received biometric data to the AR processing module 745. The AR processing module 745 uses the biometric data to determine one or more indications that would assist the user 130 in performing an activity. The indications (or variable light-based representations) can be used to communicate to the user 130 satisfaction of one or more physiological-based thresholds, such as a hydration threshold, an oxygen level threshold, cardiovascular zone thresholds, a posture threshold, and/or other thresholds discussed in detail below. More specifically, the AR processing module 745 determines whether the sensor data satisfies one or more physiological-based thresholds and determines an indication to be provided to the user 130 for communicating satisfaction of the physiological-based thresholds. In some embodiments, the AR processing module 745 determines one or more physiological-based thresholds based on sensor data stored over a predetermined period of time (e.g., 1 week, 30 days, 3 months, etc.). In some embodiments, the AR processing module 745 dynamically determines the one or more physiological-based thresholds based on the user 130's performance of an activity (e.g., adjusting a physiological-based threshold when a user 130 is sick or performing a recovery workout). Instructions for generating the determined indications are provided to the illumination source 727 to cause the illumination source 727 to illuminate in accordance with the determined indication.

In some embodiments, the one or more imaging devices 755 can include an ultra-wide camera, a wide camera, a telephoto camera, a depth-sensing cameras, or other types of cameras. In some embodiments, the one or more imaging devices 755 are used to capture image data and/or video data via the wrist-wearable device 188. The captured image data can be processed and stored in memory and then presented to a user for viewing. The one or more imaging devices 755 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 755 is stored in memory 760 (which can include volatile and non-volatile memory such that the image data and/or video data can be temporarily or permanently stored, as needed depending on the circumstances).

The one or more processors 750 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 760. The memory 760 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the wrist-wearable device 188 and the processor 750. The memory 760 also provides a storage area for data and instructions associated with applications and data handled by the processor 750.

In some embodiments, the memory 760 stores at least the sensor data 762 and AR processing data 764. The sensor data 762 includes sensor data monitored by one or more sensors 725 of the head-worn wearable device 110 and/or sensor data received from one or more devices communicative coupled with the head-worn wearable device 110, such as a wrist-wearable device 188, smartphone 774*b*, etc. The sensor data 562 can include sensor data collected over a predetermined period of time that can be used by the AR processing module 745. The AR processing data 764 can include one or more indications previously determined by the AR processing module 745, user preference in the customization or determination of the indications (e.g., color preference, pattern preference, frequency preference, etc.), one or more predefined physiological-based thresholds, and one or more physiological-based thresholds determined by the AR processing module 745.

The wrist-wearable device 188 can include a communication interface 715*a*, a display 720, one or more sensors 725*a*, an illumination source 727*a*, one or more imaging devices 755*a* (e.g., a camera), one or more applications 735*a*, one or more processors 750*a*, and memory 760*a* (including sensor data 762*a* and AR processing data 764*a*). In some embodiments, the display 720*a* of the wrist-wearable device 188 operates as an illumination source 727*a*. In some embodiments, the one or more components of the wrist-wearable device 188 are housed within a capsule (or watch body) and/or a band of the wrist-wearable device 188. The wrist-wearable device 188 is configured to communicatively couple with the head-worn wearable device 110 (or other devices (e.g., electronic device 774)) using communication interface 715*a*. In some embodiments, the wrist-wearable device 188 is configured to communicatively couple with the head-worn wearable device 110 (or other devices (e.g., electronic device 774)) via an application programming interface (API). In some embodiments, the wrist-wearable device 188 operates in conjunction with the head-worn wearable device 110 to determine a variable light-based representation of an activity performed by the user 130. Similar to the head-worn wearable device 110, the wrist-wearable device 188 can use the AR processing module 745*a* to generate instructions that cause an illumination source 727*a* to illuminate in accordance with the determined variable light-based representation.

Electronic devices 774 can also include a communication interface 715*d*, a display 720*d*, one or more sensors 725*d*, one or more applications 735*d*, an AR processing module 745*d*, one or more processors 750*d*, and memory 760*d* (including sensor data 762*d* and AR processing data 764*d*). Although not shown, in some embodiments, the electronic devices 774 can include an illumination source 727*d* and/or one or more imaging devices 755*d*. The electronic devices 774 are configured to communicatively couple with the head-worn wearable device 110 (or other devices) using communication interface 715*d*. In some embodiments, the electronic devices 774 are configured to communicatively couple with the head-worn wearable device 110 (or other devices) via an application programming interface (API). In some embodiments, the electronic devices 774 operate in conjunction with the head-worn wearable device 110 to determine a variable light-based representation of an activity performed by the user 130. The electronic devices 774, like the head-worn wearable device 110, can use the AR processing module 745*d* to generate instructions that cause an illumination source 727 to illuminate in accordance with the determined variable light-based representation.

Server 770 includes a communication interface 715*c*, one or more applications 735*c*, an AR processing module 745*c*, one or more processors 750*c*, and memory 760*c* (including sensor data 762*c* and AR processing data 764*c*). In some embodiments, the server 770 is configured to receive sensor data from one or more devices, such as the head-worn wearable device 110, the wrist-wearable device 188, and/or electronic device 774, and use the received sensor data to determine a variable light-based representation (using the AR processing module 745*c*). The server 770 can generate instructions that cause an illumination source 727*c* to illuminate in accordance with the determined variable light-based representation and provides the generated instruction to one or more communicatively coupled devices, such as the head-worn wearable device 110.

Further embodiments also include various subsets of the above embodiments including embodiments described with reference to FIGS. 1A-7 combined or otherwise re-arranged.

Example Aspects

A few example aspects will now be briefly described.

(A1) In accordance with some embodiments, a method of coordinating display of biometric data at a head-worn wearable device based on sensor data from a wrist-wearable device is disclosed. The method includes receiving an indication that a user of a head-worn wearable device is performing a physical activity. The head-worn wearable device includes at least one light-emitting diode visible to the user while wearing the head-worn wearable device, and the head-worn wearable device is in communication with a wrist-wearable device worn by the user during the physical activity, the wrist-wearable device being configured to sense biometric data for the user during the physical activity. The method includes, after receiving the indication and while the user is performing the physical activity, in accordance with a determination that the biometric data satisfies a physiological-based threshold indicating that information about the biometric data would assist the user in performing the physical activity, causing the head-worn wearable device to present, via the at least one light-emitting diode of the head-worn wearable device, the information about the biometric data.

(A2) In some embodiments of A1, the method further includes while the user is performing the physical activity receiving position data sensed by one or more sensors of the wrist-wearable device, the one or more sensors being distinct from a biometric sensor used to sense the biometric data, and in accordance with a determination that the position data indicates that the user requires guidance in performing the physical activity, causing the head-worn wearable device to present, via the at least one light-emitting diode of the head-worn wearable device, guidance to assist the user in performing the physical activity.

(A3) In some embodiments of A2, the guidance to assist the user in performing the physical activity is caused to be presented in conjunction with audible feedback, presented via a speaker of the head-worn wearable device, that also assists the user in performing the physical activity.

(A4) In some embodiments of A2, the determination that the position data indicates that the user requires guidance is made when it is determined that the position data indicates that the user is incorrectly performing the physical activity.

(A5) In some embodiments of any of A1-A4, the head-worn wearable device includes a plurality of light-emitting diodes, including the at least one light-emitting diode, and the information about the biometric data is caused to be provided using more than one of the plurality of light-emitting diodes.

(A6) In some embodiments of any of A1-A4, the head-worn wearable device includes a plurality of light-emitting diodes, including the at least one light-emitting diode, the information about the biometric data is caused to be provided using only the at least one light-emitting diode, and the wrist-wearable device is configured to monitor additional biometric data for the user during the physical activity, the additional biometric data being sensed using an additional biometric sensor that is distinct from a biometric sensor used to send the biometric data. The method further includes, while the user is performing the physical activity, in accordance with a determination that additional biometric data satisfies an additional physiological-based threshold, distinct from the physiological-based threshold, indicating that information about the additional biometric data would assist the user in performing the physical activity, causing the head-worn wearable device to present, via an additional light-emitting diode of the plurality of light-emitting diodes, the information about the additional biometric data.

(A7) In some embodiments of A6, the information about the additional biometric data and the information about the biometric data are caused to be presented via the additional light-emitting diode and the at least one light-emitting diode, respectively, during an overlapping period of time.

(A8) In some embodiments of A6 or A7, the wrist-wearable device is configured to monitor further biometric data for the user during the physical activity, the further biometric data being sensed using one other biometric sensor that is distinct from the biometric sensor and the additional biometric sensor. The method further includes while the user is performing the physical activity, in accordance with a determination that further biometric data satisfies a further physiological-based threshold, distinct from the physiological-based threshold and the additional physiological-based threshold, indicating that information about the further biometric data would assist the user in performing the physical activity, causing the head-worn wearable device to present, via a further light-emitting diode of the plurality of light-emitting diodes, the information about the further biometric data.

(A9) In some embodiments of A8, the information about the additional biometric data, the information about the biometric data, and the information about the further biometric data are caused to be presented via the additional light-emitting diode, the at least one light-emitting diode, and the further light-emitting diode, respectively, during an overlapping period of time.

(A10) In some embodiments of any of A1-A9, the physiological-based threshold is associated with a type of the physical activity performed by the user, the biometric data sensed by the wrist-wearable device is biometric data of a first type, and at least one different physiological-based threshold, distinct from the physiological-based threshold, is used to determine when to cause presentation of information about biometric data of the first type when the user is performing a different physical activity.

(A11) In some embodiments of any of A1-A10, the method further includes responsive to a determination that the user of the head-worn wearable device is performing the physical activity, monitoring, by the head-worn wearable device, biometric data sensed by a biometric sensor of the head-worn wearable device and in accordance with a determination that the biometric data sensed by the biometric sensor of the head-worn wearable device satisfies the physiological-based threshold indicating that information about the biometric data would assist the user in performing the physical activity, causing the head-worn wearable device to present, via one other light-emitting diode of the head-worn wearable device, the information about the biometric data sensed by the biometric sensor of the head-worn wearable device.

(A12) In some embodiments of A11, the one other light-emitting diode is the same as the at least one light-emitting diode, the biometric data sensed by the biometric sensor of the head-worn wearable device and the biometric data sensed by the wrist-wearable device for the user during the physical activity are analyzed together to produce consolidated biometric data, and the information about the biometric data sensed by the biometric sensor of the head-worn wearable device and the information about the biometric data are caused to be presented by causing presentation of information about the consolidated biometric data.

(A13) In some embodiments of any of A1-A12, the method further includes responsive to a determination that the user of the head-worn wearable device is performing the physical activity, monitoring, by the head-worn wearable device, position data sensed by one or more sensors of the head-worn wearable device. The method also includes, in accordance with a determination that the position data sensed by the one or more sensors of the head-worn wearable device indicates that the user requires guidance in performing the physical activity, causing the head-worn wearable device to present, via the at least one light-emitting diode of the head-worn wearable device, guidance to assist the user in performing the physical activity.

(A14) In some embodiments of any of A1-A13, a determination that the user of the head-worn wearable device is performing the physical activity is based on one or more of position data sensed by one or more sensors of the head-worn wearable device, biometric data sensed by a biometric sensor of the head-worn wearable device, and an input command provided by the user at the head-worn wearable device.

(A15) In some embodiments of A14, a determination that the user of the head-worn wearable device is performing the physical activity is further based on one or more of position data sensed by one or more sensors of the wrist-wearable device, biometric data sensed by a biometric sensor of the wrist-wearable device, and an input command provided by the user at the wrist-wearable device.

(A16) In some embodiments of any of A1-A15, the head-worn wearable device includes a housing, and the at least one light-emitting diode is coupled with the housing of the head-worn wearable device.

(A17) In some embodiments of any of A1-A16, the head-worn wearable device includes one or more lenses, and the at least one light-emitting diode is coupled with the one or more lenses of the head-worn wearable device.

(A18) In some embodiments of any of A1-A17, the physiological-based threshold includes one or more of a hydration threshold, a velocity threshold, an oxygen level threshold, a heart-rate zone threshold, a stress threshold, and a posture threshold.

(A19) In some embodiments of any of A1-A18, the head-worn wearable device does not include a heads-up display.

(A20) In some embodiments of any of A1-A19, causing presentation of the information about the biometric data via the at least one light-emitting diode of the head-worn wearable device includes causing illumination of the light-emitting diode using one or more of a plurality of patterns, frequencies, and colors.

(B1) In accordance with some embodiments, a head-worn wearable device for coordinating display of biometric data, the head-worn wearable device configured to perform or cause performance of the method of any of A1-A20.

(C1) In accordance with some embodiments, a system for coordinating display of biometric data at a head-worn wearable device based on sensor data from a wrist-wearable device, the system configured to perform or cause performance of the method of any of A1-A20.

(D1) In accordance with some embodiments, non-transitory, computer-readable storage medium including instructions that, when executed by a head-worn wearable device, a wrist-wearable device, or an intermediary device in communication with the head-worn wearable device and the wrist-wearable device, cause performance of the method of any of A1-A20.

(E1) In another aspect, a means on a wrist-wearable device, head-worn wearable device, and/or intermediary device for performing or causing performance of the method of any of claims A1-A20.

(F1) In accordance with some embodiments, a wrist-wearable device for coordinating display of biometric data, the wrist-wearable device configured to perform or cause performance of the method of any of claims A1-A20.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of indicating biometric data, the method comprising:

receiving, from a wrist-wearable device, an indication that a user of a head-worn wearable device is performing a physical activity, wherein:

the head-worn wearable device includes a light-emitting diode (LED), the LED is coupled to an interior portion of a frame of the head-worn wearable device and adjacent to a lens of the head-worn wearable device, light from the LED is emitted towards the user while wearing the head-worn wearable device, and the head-worn wearable device is in communication with the wrist-wearable device worn by the user during the physical activity, the wrist-wearable device being configured to sense biometric data for the user during the physical activity;

while the user is performing the physical activity:

receiving, from the wrist-wearable device, an indication of the biometric data sensed from the user during the physical activity; and in accordance with a determination that the biometric data satisfies a physiological-based threshold associated with the physical activity, causing the head-worn wearable device to illuminate the LED at a first frequency; and causing illumination of the LED at a second frequency to indicate non-physiological information to the user, the second frequency different from the first frequency.

2. The method of claim 1, further comprising:

while the user is performing the physical activity:

receiving position data sensed by one or more sensors of the wrist-wearable device, the one or more sensors being distinct from a biometric sensor used to sense the biometric data; and in accordance with a determination that the position data indicates that the user requires guidance in performing the physical activity, causing the head-worn wearable device to present, via the LED of the head-worn wearable device, guidance to assist the user in performing the physical activity.

3. The method of claim 1, wherein:

the head-worn wearable device includes a plurality of LEDs, including the LED, and in accordance with the determination that the biometric data satisfies the physiological-based threshold associated with the physical activity, causing illumination of more than one of the plurality of LEDs.

4. The method of claim 1, wherein:

the head-worn wearable device includes a plurality of light-emitting diodes, including the LED, in accordance with the determination that the biometric data satisfies the physiological-based threshold associated with the physical activity, causing illumination of only the LED, the wrist-wearable device is configured to monitor additional biometric data for the user during the physical activity, the additional biometric data being sensed using an additional biometric sensor that is distinct from a biometric sensor used to send the biometric data, and the method further comprises:

while the user is performing the physical activity:

in accordance with a determination that additional biometric data satisfies an additional physiological-based threshold, distinct from the physiological-based threshold, indicating that information about the additional biometric data would assist the user in performing the physical activity, causing the head-worn wearable device to present, via an additional light-emitting diode of the plurality of light-emitting diodes, the information about the additional biometric data.

5. The method of claim 1, wherein:

the physiological-based threshold is associated with a type of the physical activity performed by the user, the biometric data sensed by the wrist-wearable device is biometric data of a first type, and at least one different physiological-based threshold, distinct from the physiological-based threshold, is used to determine when to cause presentation of information about biometric data of the first type when the user is performing a different physical activity.

6. The method of claim 1, further comprising:

responsive to a determination that the user of the head-worn wearable device is performing the physical activity, monitoring, by the head-worn wearable device, biometric data sensed by a biometric sensor of the head-worn wearable device; and in accordance with a determination that the biometric data sensed by the biometric sensor of the head-worn wearable device satisfies the physiological-based threshold indicating that information about the biometric data would assist the user in performing the physical activity, causing the head-worn wearable device to present, via one other light-emitting diode of the head-worn wearable device, the information about the biometric data sensed by the biometric sensor of the head-worn wearable device.

7. The method of claim 1, further comprising, responsive to receiving the indication that the user of the head-worn wearable device is performing the physical activity, requesting, by the head-worn wearable device, the indication of the biometric data from the wrist-wearable device.

8. The method of claim 1, further comprising: in accordance with a determination that another physiological-based threshold associated with exhaustion or dehydration is satisfied, causing another LED of the head-worn wearable device to illuminate outwards to indicate that the user needs assistance.

9. A non-transitory, computer-readable storage medium including instructions that, when executed by one or more processors of a head-worn wearable device, cause the head-worn wearable device to:

receive, from a wrist-wearable device, an indication that a user of a head-worn wearable device is performing a physical activity, wherein:

the head-worn wearable device includes a light-emitting diode (LED), the LED is coupled to an interior portion of a frame of the head-worn wearable device and adjacent to a lens of the head-worn wearable device, light from the LED is emitted towards the user while wearing the head-worn wearable device, and the head-worn wearable device is in communication with the wrist-wearable device worn by the user during the physical activity, the wrist-wearable device being configured to sense biometric data for the user during the physical activity;

while the user is performing the physical activity:

receive, from the wrist-wearable device, an indication of the biometric data sensed from the user during the physical activity; and in accordance with a determination that the biometric data satisfies a physiological-based threshold associated with the physical activity, cause the head-worn wearable device to illuminate the LED at a first frequency; and cause illumination of the LED at a second frequency to indicate non-physiological information to the user, the second frequency different from the first frequency.

10. The non-transitory, computer-readable storage medium of claim 9, further comprising instructions that cause the head-worn wearable device to:

while the user is performing the physical activity:

receive position data sensed by one or more sensors of the wrist-wearable device, the one or more sensors being distinct from a biometric sensor used to sense the biometric data; and in accordance with a determination that the position data indicates that the user requires guidance in performing the physical activity, cause the head-worn wearable device to present, via the LED of the head-worn wearable device, guidance to assist the user in performing the physical activity.

11. The non-transitory, computer-readable storage medium of claim 10, wherein the determination that the position data indicates that the user requires guidance is made when it is determined that the position data indicates that the user is incorrectly performing the physical activity.

12. The non-transitory, computer-readable storage medium of claim 10, wherein the first frequency is a user-defined frequency.

13. The non-transitory, computer-readable storage medium of claim 9, further comprising instructions that cause the head-worn wearable device to:

responsive to a determination that the user of the head-worn wearable device is performing the physical activity, monitor, by the head-worn wearable device, biometric data sensed by a biometric sensor of the head-worn wearable device; and in accordance with a determination that the biometric data sensed by the biometric sensor of the head-worn wearable device satisfies the physiological-based threshold indicating that information about the biometric data would assist the user in performing the physical activity, cause the head-worn wearable device to present, via one other light-emitting diode of the head-worn wearable device, the information about the biometric data sensed by the biometric sensor of the head-worn wearable device.

14. A method of indicating biometric data, the method comprising:

receiving, from a wrist-wearable device, an indication that a user of a head-worn wearable device is performing a physical activity, wherein:

the head-worn wearable device includes a light-emitting diode (LED), the LED is coupled to an interior portion of a frame of the head-worn wearable device and adjacent to a lens of the head-worn wearable device, light from the LED is emitted towards the user while wearing the head-worn wearable device, and the head-worn wearable device is in communication with the wrist-wearable device worn by the user during the physical activity, the wrist-wearable device being configured to sense biometric data for the user during the physical activity;

while the user is performing the physical activity:

receiving, from the wrist-wearable device, an indication of the biometric data sensed from the user during the physical activity; and in accordance with a determination that the biometric data satisfies a physiological-based threshold associated with the physical activity, causing the head-worn wearable device to illuminate the LED with a first color; and causing illumination of the LED with a second color to indicate non-physiological information to the user, the second color different from the first color.

15. The method of claim 14, further including:

while the user is performing the physical activity:

receiving position data sensed by one or more sensors of the wrist-wearable device, the one or more sensors being distinct from a biometric sensor used to sense the biometric data; and in accordance with a determination that the position data indicates that the user requires guidance in performing the physical activity, causing the head-worn wearable device to present, via the LED of the head-worn wearable device, guidance to assist the user in performing the physical activity.

16. The method of claim 15, wherein the determination that the position data indicates that the user requires guidance is made when it is determined that the position data indicates that the user is incorrectly performing the physical activity.

17. The method of claim 14, wherein the indication that the user is performing the physical activity is received from the wrist-wearable device in accordance with the wrist-wearable device determining that the user is performing the physical activity.

18. A non-transitory, computer-readable storage medium including instructions that, when executed by one or more processors of a head-worn wearable device, cause the head-worn wearable device to:

receive, from a wrist-wearable device, an indication that a user of a head-worn wearable device is performing a physical activity, wherein:

the head-worn wearable device includes a light-emitting diode (LED), the LED is coupled to an interior portion of a frame of the head-worn wearable device and adjacent to a lens of the head-worn wearable device, light from the LED is emitted towards the user while wearing the head-worn wearable device, and the head-worn wearable device is in communication with the wrist-wearable device worn by the user during the physical activity, the wrist-wearable device being configured to sense biometric data for the user during the physical activity;

while the user is performing the physical activity:

receive, from the wrist-wearable device, an indication of the biometric data sensed from the user during the physical activity; and in accordance with a determination that the biometric data satisfies a physiological-based threshold associated with the physical activity, cause the head-worn wearable device to illuminate the LED with a first color; and cause illumination of the LED with a second color to indicate non-physiological information to the user, the second color different from the first color.

19. The non-transitory, computer-readable storage medium of claim 18, further including instructions that cause the head-worn wearable device to:

while the user is performing the physical activity:

receive position data sensed by one or more sensors of the wrist-wearable device, the one or more sensors being distinct from a biometric sensor used to sense the biometric data; and in accordance with a determination that the position data indicates that the user requires guidance in performing the physical activity, cause the head-worn wearable device to present, via the LED of the head-worn wearable device, guidance to assist the user in performing the physical activity.

20. The non-transitory, computer-readable storage medium of claim 19, wherein the determination that the position data indicates that the user requires guidance is made when it is determined that the position data indicates that the user is incorrectly performing the physical activity.

21. The non-transitory, computer-readable storage medium of claim 18, wherein the physiological-based threshold is dynamically adjusted while the physical activity is being performed.

22. The non-transitory, computer-readable storage medium of claim 18, wherein:

the physiological-based threshold corresponds to an oxygen saturation of the user, the head-worn wearable device includes a second LED, and the second LED is associated with a second physiological-based threshold corresponding to a heart rate of the user.

* * * * *